(12) United States Patent
Hoya

(10) Patent No.: US 7,496,546 B2
(45) Date of Patent: Feb. 24, 2009

(54) INTERCONNECTING NEURAL NETWORK SYSTEM, INTERCONNECTING NEURAL NETWORK STRUCTURE CONSTRUCTION METHOD, SELF-ORGANIZING NEURAL NETWORK STRUCTURE CONSTRUCTION METHOD, AND CONSTRUCTION PROGRAMS THEREFOR

(75) Inventor: Tetsuya Hoya, Wako (JP)

(73) Assignee: Riken, Wako-Shi, Saitama (JP)

( * ) Notice: Subject to any disclaimer, the term of this patent is extended or adjusted under 35 U.S.C. 154(b) by 153 days.

(21) Appl. No.: 10/806,090

(22) Filed: Mar. 23, 2004

(65) Prior Publication Data

US 2004/0193559 A1   Sep. 30, 2004

(30) Foreign Application Priority Data

Mar. 24, 2003   (JP)   ............................. 2003-080940

(51) Int. Cl.
*G06F 15/00*   (2006.01)

(52) U.S. Cl. .................. 706/20; 706/15; 706/26
(58) Field of Classification Search ............... 706/27, 706/26, 15–22
See application file for complete search history.

(56) References Cited

U.S. PATENT DOCUMENTS

| 5,335,291 A | * | 8/1994 | Kramer et al. | ............... 382/158 |
|---|---|---|---|---|
| 5,761,383 A | * | 6/1998 | Engel et al. | .................... 706/14 |
| 6,219,657 B1 | * | 4/2001 | Hatayama | .................... 706/14 |
| 6,243,490 B1 | * | 6/2001 | Mita | ........................... 382/158 |
| 6,907,412 B2 | * | 6/2005 | Pao et al. | ....................... 706/16 |
| 7,069,257 B2 | * | 6/2006 | Huang | .......................... 706/20 |
| 2003/0115165 A1 | * | 6/2003 | Hoya | ............................ 706/15 |
| 2004/0143559 A1 | * | 7/2004 | Ayala | ........................... 706/13 |

OTHER PUBLICATIONS

Kevin Gurney, "An Introduction to Neural Networks" 1997, pp. 1-3, 14-15, 39-46, 115-122, 127-129, 135-136, 182-185.*

* cited by examiner

*Primary Examiner*—David R Vincent
*Assistant Examiner*—Omar F Fernandez Rivas
(74) *Attorney, Agent, or Firm*—Birch, Stewart, Kolasch & Birch, LLP

(57) ABSTRACT

This invention provides an interconnecting neural network system capable of freely taking a network form for inputting a plurality of input vectors, and facilitating additionally training an artificial neural network structure. The artificial neural network structure is constructed by interconnecting RBF elements relating to each other among all RBF elements via a weight. Each RBF element outputs an excitation strength according to a similarity between each input vector and a centroid vector based on a radius base function when the RBF element is excited by the input vector applied from an outside, and outputs a pseudo excitation strength obtained based on the excitation strength output from the other RBF element when the RBF element is excited in a chain reaction to excitation of the other neuron connected to the neuron.

19 Claims, 9 Drawing Sheets

INTERCONNECTING NEURAL NETWORK SYSTEM, INTERCONNECTING NEURAL NETWORK STRUCTURE CONSTRUCTION METHOD, SELF-ORGANIZING NEURAL NETWORK STRUCTURE CONSTRUCTION METHOD, AND CONSTRUCTION PROGRAMS THEREFOR

This Nonprovisional application claims priority under 35 U.S.C. § 119(a) on Patent Application No(s). 2003-080940 filed in Japan on Mar. 24, 2003, the entire contents of which are hereby incorporated by reference.

BACKGROUND OF THE INVENTION

1. Field of the Invention

The present invention relates to an artificial neural network structure. More specifically, the present invention relates to an interconnecting neural network system, an interconnecting neural network structure construction method, a self-organizing neural network structure construction method having a novel network form excellent in flexibility of structure and in facility of training, and construction programs therefor.

2. Related Art

As a conventional artificial neural network structure, an artificial neural network structure having a fixed network form such as a layered network that inputs a single input vector and adjusting network parameters such as weight vectors is normally known. As a method of adjusting the network parameters, a back-propagation method for iteratively updating network parameters is widely used (D. E. Rumelhart, G. E. Hinton, and R. J. Williams, "Learning internal representations by error propagation," In D. E. Rumelhart and J. L. McClelland (Eds.), "Parallel Distributed Processing: explorations in the microstructure of cognition," 1. Chapter 8, Cambridge, Mass. MIT Press, 1986).

However, for the conventional artificial neural network structure, an iterative training scheme for iteratively updating network parameters, such as the back-propagation method, is employed as the method of adjusting network parameters. Due to this, the conventional artificial neural network structure has the following disadvantages: (1) it takes considerable time to update network parameters before the connection between input and output is established; (2) a solution obtained as a result of updating network parameters tends to be a local minimum and it is difficult to obtain a correct solution; and (3) it is difficult to realize a robust additional training method.

Furthermore, the conventional artificial neural network structure has disadvantages in that the structure is inferior in network configuration flexibility and no practical, effective method capable of handling a plurality of input vectors is established yet.

As a conventional method of handling a plurality of input vectors in the artificial neural network structure, a modular approach for modularizing various neural networks (or agents) and integrating the neural network (or agent) modules is proposed (S. Haykin, "Neural Networks: A Comprehensive Foundation," Macmillan College Publishing Co. Inc., N.Y., 1994).

Even if such an approach is used, an artificial neural network structure having a fixed network form based on an iterative training scheme is used for every network module similarly to the conventional artificial neural network structure. Therefore, the approach is faced with the substantial disadvantages stated above, as well.

SUMMARY OF THE INVENTION

In this background, the inventor of the present invention proposed a novel neural network structure to which an RBF neural network structure (see S. Haykin, "Neural Networks: A Comprehensive Foundation," Macmillan College Publishing Co. Inc., N.Y., 1994) for outputting an excitation strength according to a similarity between an input vector and a centroid vector based on a radial basis function ("RBF") is applied (see Japanese Patent Application No. 2001-291235 (i.e., Japanese Patent Laid-open Publication No. 2003-99756)). The inventor of the present invention also proposed a method of realizing a function of a storage chain by linking RBF elements included in the RBF neural network to one another (see Japanese Patent Application No. 2002-100223).

The present invention provides a further development of the methods proposed in the Japanese Patent Application Nos. 2001-291235 and 2002-100223. It is an object of the present invention to provide an interconnecting neural network system, an interconnecting neural network system construction method, a self-organizing neural network structure construction method, and construction programs therefore, capable of freely taking a network form for inputting a plurality of input vectors, and facilitating an additional training of an artificial neural network structure.

According to a first aspect of the present invention, there is provided an interconnecting neural network system comprising: a neural network unit that includes a plurality of neurons, each of the neurons outputting an excitation strength according to a similarity between an input vector and a centroid vector based on a kernel function; and a network control unit that constructs an artificial neural network structure by interconnecting neurons relating to each other among the neurons in the neural network unit via a weight, wherein each of the neurons in the neural network unit outputs an excitation strength according to a similarity between an input vector and a centroid vector based on a kernel function when the each neuron is excited by the input vector applied from an outside, and outputs a pseudo excitation strength obtained based on an excitation strength output from the other neuron when the each neuron is excited in a chain reaction to excitation of the other neuron connected to the each neuron.

According to the first aspect of the invention, it is preferable that the each neuron in the neural network unit outputs the pseudo excitation strength and also outputs the centroid vector of the each neuron when the each neuron is excited in a chain reaction to the excitation of the other neuron connected to the each neuron.

According to the first aspect of the invention, it is also preferable that the network control unit interconnects the neurons relating to each other among the neurons in the neural network unit, based on an order of the neurons added or excited at time series in association with a plurality of input vectors applied to the neural network unit from the outside.

According to the first aspect of the invention, it is also preferable that the network control unit trains the weight that connects the neurons to each other, based on the excitation strength of the each neuron in the neural network unit.

According to the first aspect of the invention, it is also preferable that the network control unit removes the each neuron at a predetermined timing determined based on the excitation strength of the each neuron in the neural network unit.

According to the first aspect of the invention, it is further preferable that the each neuron in the neural network unit is an intermediate layer neuron using, as the centroid vector, centroid data in a matrix form in light of time series changes, and that the each intermediate layer neuron is connected to an output layer neuron that outputs a change in the excitation strength output from the each intermediate layer neuron at time series.

According to a second aspect of the present invention, there is provided a method of constructing an interconnecting neural network structure, the method comprising the steps of: preparing an artificial neural network structure including a plurality of neurons, each of the neurons outputting an excitation strength according to a similarity between an input vector and a centroid vector based on a kernel function, the neurons relating to each other being interconnected in the artificial neural network structure via a weight; and training the weight that connects the neurons to each other based on the excitation strength of the each neuron.

According to the second aspect of the invention, it is also preferable that, in the step of preparing the artificial neural network structure, the neurons relating to each other are interconnected in the artificial neural network structure based on an order of the neurons added or excited at time series in association with a plurality of input vectors applied from an outside.

According to the second aspect of the invention, it is also preferable to further comprise a step of removing the each neuron at a predetermined timing determined based on the excitation strength of the each neuron.

According to a third aspect of the present invention, there is provided a method of constructing a self-organizing neural network structure including a plurality of neurons, each of the neurons outputting an excitation strength according to a similarity between an input vector and a centroid vector based on a kernel function, the neurons relating to each other being autonomously connected in the self-organizing neural network structure based on the input vector, the method comprising: a first step of adding a neuron, which has an input vector as a centroid vector for a kernel function, into the self-organizing neural network structure as a new neuron based on an input vector that is input first from an outside; and a second step of repeating following processings (a) to (c), each of the processings being based on an input vector that is an $n^{th}$ input vector from the outside, where n is an integer equal to or greater than 2: (a) the processing of calculating excitation strengths of all the neurons in the self-organizing neural network structure based on the $n^{th}$ input vector input from the outside; (b) the processing of adding a neuron, which has the $n^{th}$ input vector as a centroid vector for a kernel function, into the self-organizing neural network structure as a new neuron in case that it is determined by the processing (a) that there is no neuron excited such that the excitation strength thereof exceeds a predetermined threshold among one or a plurality of neurons in the self-organizing neural network structure; and (c) the processing of performing both of or one of formation of a weight that connects the neurons, and training of the formed weight based on the excitation strengths of the neurons in the self-organizing neural network structure.

According to the third aspect of the invention, it is also preferable that, in the second step, a processing (d) of removing a neuron determined to be unnecessary based on the excitation strengths of the neurons in the self-organizing neural network structure is further performed.

According to the third aspect of the invention, it is also preferable that each of the neurons in the self-organizing neural network structure holds a class label relating to a final output, and that, in the processing (c) in the second step, only in case that the class label held by the each neuron in the self-organizing neural network structure is identical, both of or one of the formation of the weight that connects the neurons, and the training of the formed weight is performed based on the excitation strengths of the neurons.

According to the third aspect of the invention, the neurons in the self-organizing neural network structure may have a single modality (e.g., an auditory modality or a visual modality), or the neurons in the self-organizing neural network structure may have a plurality of modalities different from one another (e.g., both the auditory modality and the visual modalities).

According to the first to third aspects of the invention, it is preferable that the kernel function employed in the each neuron includes a radial basis function.

According to a fourth aspect of the present invention, there is provided a computer readable recording medium storing an interconnecting neural network structure construction program that allows a computer to execute the method according to the second aspect or the third aspect.

According to a fifth aspect of the present invention, there is provided an interconnecting neural network system comprising: a plurality of intermediate layer neurons, each of the intermediate layer neurons outputting an excitation strength according to a similarity between an input vector and a centroid vector based on a kernel function, and each of the intermediate layer neurons using centroid data in a matrix form in light of time series changes as the centroid vector; and an output layer neuron connected to each of the intermediate layer neurons and outputting a change in the excitation strength output from the each intermediate layer neuron at time series.

The kernel function according to the first to fifth aspects of the present invention stated above means a function for outputting a relationship between two vectors (see Literature of N. Cristianini and J. S. Taylor, "An Introduction to Support Vector Machines," Cambridge Univ. Press, 2000). An arbitrary function can be used as the kernel function. However, an RBF based on a Gaussian function that represents a distance metric for correlation between two vectors, a function using a norm, a function using an inner product between two vectors, a function using Epanechinikov quadratic or Tri-cube, or the like is normally, preferably used.

According to the first to fourth aspects of the present invention, the artificial neural network structure is constructed by interconnecting the neurons relating to each other via the weight. Each neuron outputs the excitation strength according to the similarity between the input vector and the centroid vector based on the kernel function when the neuron is excited by the input vector applied from the outside. The neuron also outputs the pseudo excitation strength obtained based on the excitation strength output from the other neuron when the neuron is excited in a chain reaction to the excitation of the other neuron connected to the neuron. Therefore, one neuron can belong to a plurality of networks, and a plurality of neurons can be connected in an arbitrary network form. Accordingly, differently from the conventional fixed network form in which a single input vector is input, a plurality of input vectors can be freely handled, and the configuration change and the like can be flexibly made. In this case, since the neuron can belong to a plurality of networks having different modalities, it is possible to freely handle input vectors having a plurality of different modalities such as the auditory modality and the visual modality, and to widely apply the system not only to single-domain pattern recognition but also to multi-domain pattern recognition.

According to the first to fourth aspects of the present invention, each weight that connects the neurons to each other is updated and thereby trained. This, therefore, facilitate additionally training the artificial neural network structure.

According to the first to fourth aspects of the present invention, each weight that connects the neurons to each other can be updated independently of the outputs of the neurons. Therefore, differently from the conventional training algorithm such as the back-propagation method, only the weights stored in a distributed fashion for specifying the connection relationships between the neurons can be iteratively updated while locally storing data in the neurons as the centroid vectors without influencing at all the data stored in the respective neurons during the training of the weight. Accordingly, it is possible to realize data representations having different properties, i.e., a distribution property and a localization property. In addition, it is possible to construct a memory element that is advantageous, and that possesses both generalization performance and additional training performance.

According to the first to fourth aspects of the present invention, a plurality of intermediate layer neurons using centroid data in a matrix form in light of changes at time series as centroid vectors may be provided, and the output layer neurons connected to the intermediate layer neurons may output changes in excitation strengths output from the respective intermediate layer neurons at time series. It is thereby possible to facilitate constructing the recognition system such as a database incremental search function, that narrows down final candidates with the passage of time.

According to the fifth aspects of the present invention, a plurality of intermediate layer neurons using centroid data in a matrix form in light of changes at time series as centroid vectors are provided, and the output layer neurons connected to the intermediate layer neurons output changes in excitation strengths output from the respective intermediate layer neurons at time series. It is thereby possible to facilitate constructing the recognition system such as a database incremental search function, that narrows down final candidates with the passage of time.

DETAILED DESCRIPTION OF THE INVENTION

An embodiment of the present invention will be described hereinafter with reference to the drawings.

<Overall Configuration>

Figure 1:
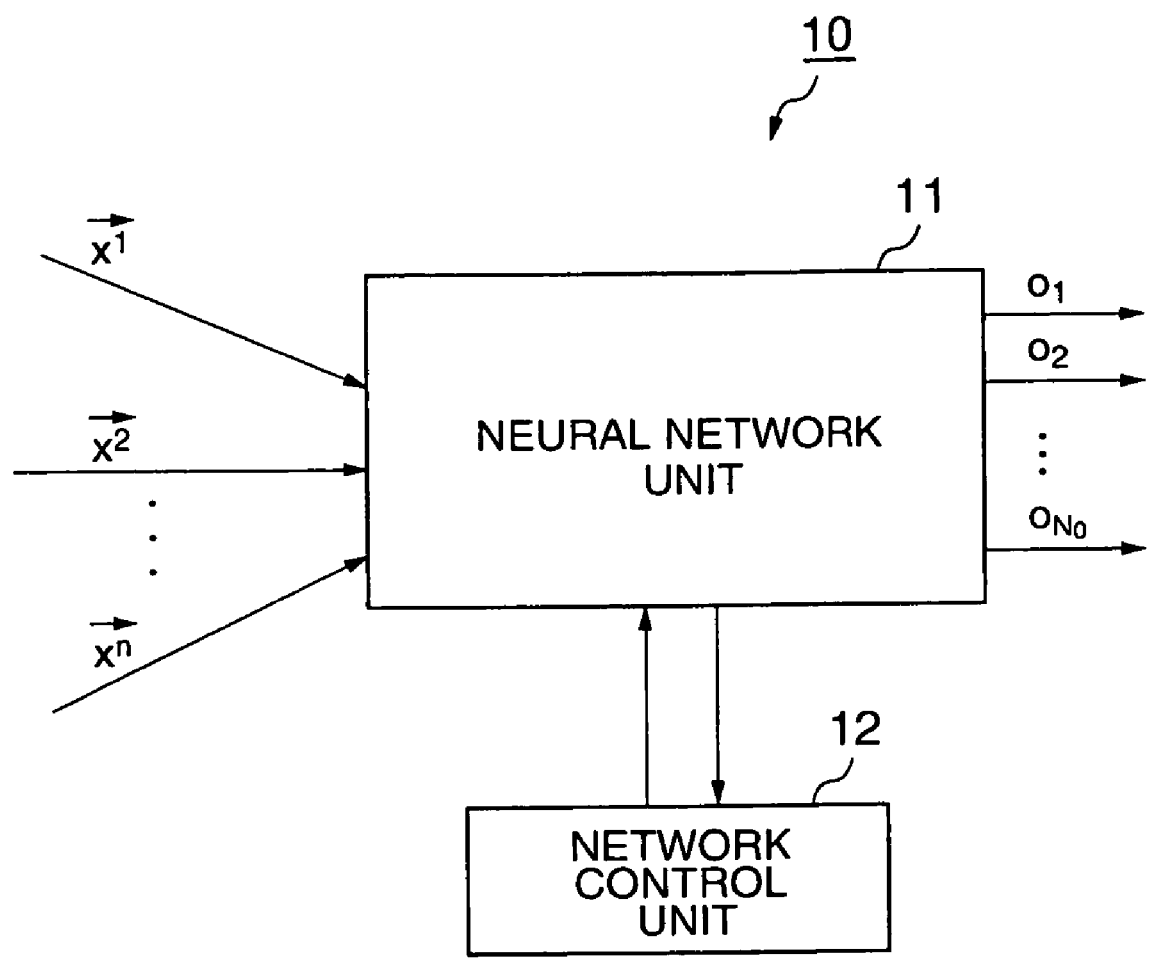
FIG. 1 is a block diagram for the overall configuration of an interconnecting neural network system according to an embodiment of the present invention.

Referring first to FIG. 1, the overall configuration of an interconnecting neural network system according to an embodiment of the present invention will be described.

As shown in FIG. 1, the interconnecting neural network system 10 includes a neural network unit 11 and a network control unit 12 that controls the neural network unit 11.

The neural network unit 11 inputs a plurality of input vectors $\underline{x}^1, \underline{x}^2, \ldots,$ and $\underline{x}^n$ (hereinafter, an underlined English letter denotes a vector) and outputs a plurality of outputs (scalars) $o_1, o_2, \ldots,$ and $o_{No}$. The neural network unit 11 includes a plurality of RBF elements (neurons) that output excitation strengths according to the input vectors $\underline{x}^1, \underline{x}^2, \ldots,$ and $\underline{x}^n$, respectively, in accordance with an RBF.

The network control unit 12 constructs an artificial neural network structure by interconnecting the two RBF elements relating to each other through a weight among the RBF elements of the neural network unit 11.

<Artificial Neural Network Structure>

Figure 2:
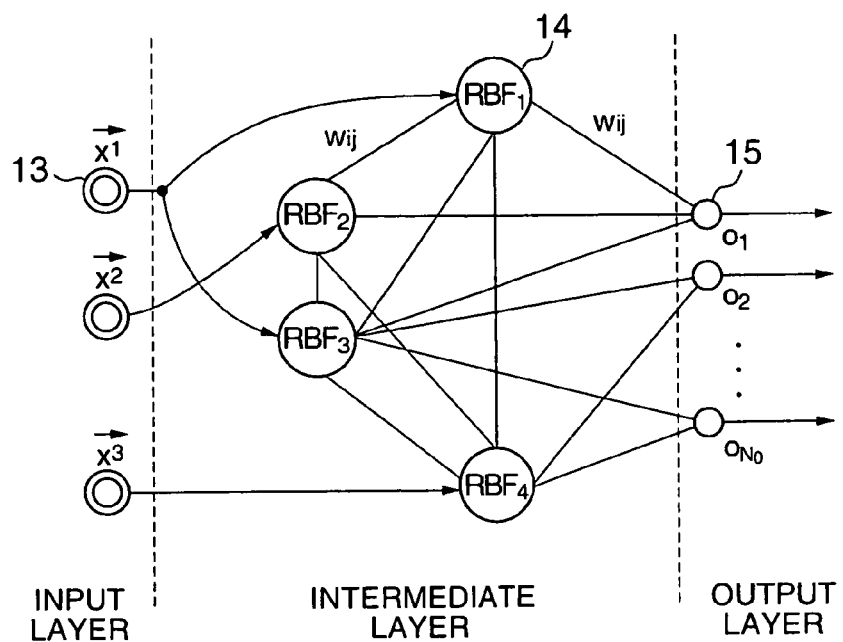
FIG. 2 depicts an example of an artificial neural network structure constructed in a neural network unit in the interconnecting neural network system shown in FIG. 1.

FIG. 2 depicts an example of the artificial neural network structure constructed in the neural network unit 11 shown in FIG. 1.

As shown in FIG. 2, this artificial neural network structure includes: three input layer neurons 13 for inputting three input vectors $\underline{x}^1, \underline{x}^2,$ and $\underline{x}^3$, respectively; RBF elements (intermediate layer neurons) 14 for outputting excitation strengths according to the input vectors $\underline{x}^1, \underline{x}^2,$ and $\underline{x}^3$ input through the input layer neurons 13; and output layer neurons 15 for outputting final output (scalars) $o_1, o_2,$ and $o_{No}$ based on the excitation strengths output from the RBF elements 14.

The four RBF elements 14 ($RBF_1, RBF_2, RBF_3,$ and $RBF_4$) serving as the intermediate layer neurons are connected to one another through weights $w_{ij}$. In addition, such RBF elements 14 ($RBF_1$, $RBF_2$, $RBF_3$, and $RBF_4$) are connected to the output layer neurons 15 ($o_1$, $o_2$, and $o_{NO}$) through weights $w_{ij}'$.

<RBF Element>

The RBF elements 14 included in the neural network unit 11 will be described in detail with reference to FIG. 3.

Figure 3:
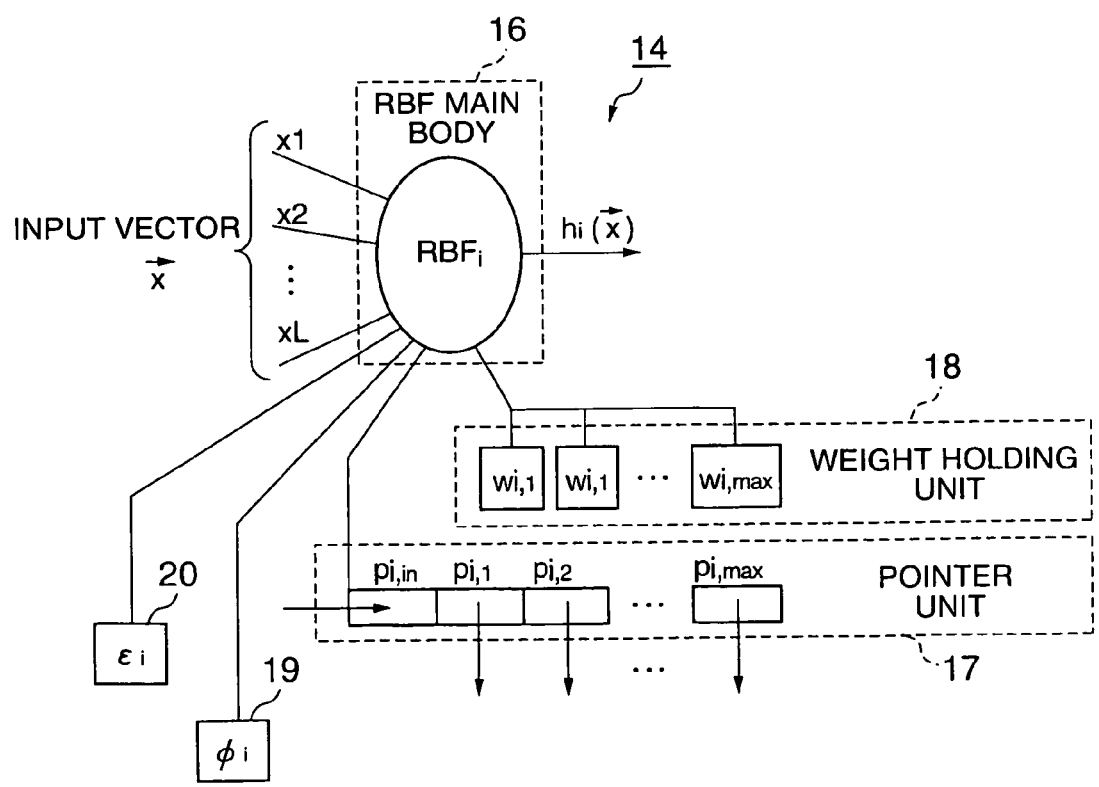
FIG. 3 depicts the configuration of an RBF element (a neuron) used in the neural network unit shown in FIG. 2.

As shown in FIG. 3, each RBF element 14 includes an RBF main body unit 16, a pointer unit 17, a weight holding unit 18, a duration variable holding unit 19, and an activation time holding unit 20.

Among the constituent elements of the RBF element 14, the RBF main body unit 16 outputs the excitation strength according to the input vector based on the RBF when the RBF element 14 is activated by the input vector $\underline{x}$ applied from the outside, and outputs a pseudo excitation strength obtained based on the excitation strength output from the other RBF element when the RBF element 14 is activated in a chain reaction to the excitation of the other RBF element connected to this RBF element 14.

Specifically, the excitation strength $h_i(\underline{x})$ of the RBF main body unit 16 in the $i^{th}$ RBF element 14 ($RBF_i$) when the input vector $\underline{x}$ is applied to the $RBF_i$ is represented by the following Equation (1). In Equation (1), $\underline{c}_i$ denotes a centroid vector of the RBF element 14 ($RBF_i$) and $\sigma_i$ denotes a radius.

$$h_i(\vec{x}) = \exp\left(-\frac{\|\vec{x} - \vec{c}_i\|_2^2}{\sigma_i^2}\right) \quad (1)$$

On the other hand, the pseudo excitation strength $h_i$ of the RBF main body unit 16 in the $i^{th}$ RBF element 14 ($RBF_i$) is represented by the following Equation (2). In Equation (2), $h_k$ denotes the excitation strength of the RBF main body unit 16 in the other RBF element 14 ($RBF_k$) connected to the $i^{th}$ RBF element 14 ($RBF_i$), $w_{ki}$ denotes a weight for connecting the $i^{th}$ RBF element 14 ($RBF_i$) to the other RBF element 14 ($RBF_k$), and $L_i$ denotes the number of other RBF elements 14 ($RBF_k$) connected to the $i^{th}$ RBF element 14 ($RBF_i$).

$$h_i = \frac{1}{L_i} \sum_{k=1}^{L_i} w_{ki} h_k \quad (2)$$

Alternatively, the RBF main body unit 16 may output the pseudo excitation strength as represented by Equation (2) and the centroid vector $\underline{c}_i$ of the RBF element (e.g., the $i^{th}$ RBF element 14 ($RBF_i$)) when the RBF element ($RBF_i$) is activated in a chain reaction to the excitation of the other RBF elements connected to the RBF element ($RBF_i$).

The pointer unit 17 holds a plurality of pieces of pointer information on the other RBF elements relating to one another. As shown in FIG. 3, the pointer unit 17 of the $i^{th}$ RBF element 14 ($RBF_i$) holds addresses of the other RBF elements connected to the $i^{th}$ RBF element 14 ($RBF_i$) as indicated by $p_{i,1}$ to $p_{i,max}$, respectively.

The weight holding unit 18 holds weights for connecting the RBF elements to one another. As shown in FIG. 3, the weight holding unit 18 of the $i^{th}$ RBF element 14 ($RBF_i$) holds weights for connecting the $i^{th}$ RBF element 14 ($RBF_i$) to the other RBF elements 14 as indicated by symbols $w_{i,1}$ to $w_{i,max}$, respectively. The weights $w_{i,1}$ to $w_{i,max}$ held in the weight holding unit 18 correspond to the pointer information $p_{i,1}$ to $p_{i,max}$ held in the pointer unit 17, respectively.

The duration variable holding unit 19 is a counter that holds a variable $\phi_i$ for determining a duration of the $i^{th}$ RBF element 14 ($RBF_i$).

The activation time holding unit 20 is a counter that holds the number of times $\epsilon_i$ by which the $i^{th}$ RBF element 14 ($RBF_i$) is activated.

As shown in FIG. 2, the artificial neural network structure including such RBF elements 14 inputs a plurality of input vectors $\underline{x}^1$, $\underline{x}^2$, and $\underline{x}^3$ and outputs a plurality of outputs (scalars) $o_1$, $o_2$, ..., and $o_{No}$. If it is assumed that the RBF elements 14 ($RBF_1$, $RBF_2$, $RBF_3$, and $RBF_4$) serving as the intermediate layer neurons are connected to the output layer neurons 15 ($o_1$, $o_2$, ..., and $o_{No}$) through the weight $w_{ij}'$ in the form shown in FIG. 2, the outputs $o_j$ (j=1, 2, ..., and $N_o$) are represented by the following Equations (3) and (4). In Equations (3) and (4), $h_i$ denotes the excitation strength of the RBF main body unit 16 in the RBF element 14 ($RBF_i$ connected to the $j^{th}$ output layer neuron 15 ($o_j$), $w_{ij}$ denotes a weight for connecting the $j^{th}$ output layer neuron 15 ($o_j$) to the RBF element 14 ($RBF_i$), and $L_j$ denotes the number of RBF elements 14 ($RBF_i$) connected to the $j^{th}$ output layer neuron 15 ($o_j$).

$$o_j = 1/\delta_j \sum_{i=1}^{L_j} w_{ij}' h_i \quad (3)$$

$$\delta_j = \sum_{i=1}^{L_j} h_i \quad (4)$$

Alternatively, the outputs $o_j$ (j=1, 2, ..., and $N_o$) may be obtained not by calculating a sum of the outputs of the RBF elements 14 ($RBF_1$, $RBF_2$, $RBF_3$, and $RBF_4$) but by calculating a maximum of the excitation strengths of the RBF elements 14 ($RBF_1$, $RBF_2$, $RBF_3$, and $RBF_4$) connected to the output layer neurons 15 ($o_1$, $o_2$, ..., and $o_{No}$). If so, the outputs $o_j$ (j=1, 2, ..., and $N_o$) are represented by the following Equation (5).

$$o_j = \max(w_{ij} h_i(\underline{x})) \quad (5)$$

<Network Form>

(Interconnecting Network)

In the artificial neural network structure shown in FIG. 2, the four RBF elements 14 ($RBF_1$, $RBF_2$, $RBF_3$, and $RBF_4$) are connected to one another through the weight $w_{ij}$, thus constructing a interconnecting network as a whole. Such a interconnecting network system is a multi-modal-input multi-output ("MIMO") system capable of freely handling a plurality of vectors $\underline{x}^1$, $\underline{x}^2$, and $\underline{x}^3$, and the system can flexibly make a configuration change and the like. In this instance, the magnitude of the centroid vector of each RBF element 14 is preferably not a fixed length but a variable length according to a type of the input vector $\underline{x}^1$, $\underline{x}^2$, or $\underline{x}^3$. If so, several different sensory inputs (a voice, an image, and the like) can be processed simultaneously and composite pattern recognition can be performed similarly to a human.

As for the interconnecting neural network system 10 shown in FIG. 1, the artificial neural network structure constructed in the neural network unit 11 is not limited to that shown in FIG. 2 but may be an arbitrary network form as shown in FIGS. 4 to 7.

(Bidirectional Network)

Figure 4:
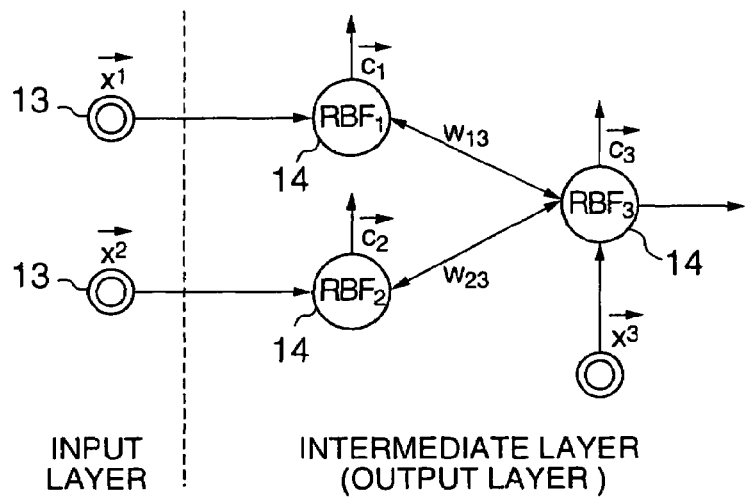
FIG. 4 depicts another example of the artificial neural network structure constructed in the neural network unit in the interconnecting neural network system shown in FIG. 1.

FIG. 4 depicts another example of the artificial neural network structure constructed in the neural network unit 11 shown in FIG. 1. The artificial neural network structure shown in FIG. 4 is constructed such that three RBF elements 14 ($RBF_1$, $RBF_2$, and $RBF_3$) are connected to one another through weights $w_{13}$ and $w_{23}$, thus constructing a bidirectional network having both feed-forward and feedback properties.

Specifically, it is assumed herein that the input vector $\underline{x}^1$ corresponds to an input vector input from an auditory sensor that corresponds to one ear, the input vector $\underline{x}^2$ corresponds to an input vector input from a visual sensor that corresponds to one eye, and that the RBF elements $RBF_1$ and $RBF_2$ are activated when the input vectors $\underline{x}^1$ and $\underline{x}^2$ are input to the $RBF_1$ and $RBF_2$, respectively. It is then assumed herein that $RBF_3$ represents a declarative memory such as (linguistic) semantic network, and that when the $RBF_3$ is activated not by the input vector $\underline{x}^3$ input from a sensor or the like but by the excitation of the $RBF_1$ and $RBF_2$ connected to the $RBF_3$ through the weights $w_{13}$ and $w_{23}$, respectively, a pseudo excitation strength $h_3$ of the $RBF_3$ is determined according to such a rule represented by Equation (6) based on Equation (2) or such a rule represented by Equation (7). It is noted that Equations (6) and (7) are assumed in advance to satisfy two conditions of $|w_{13}h_1| \leq 1$ and $|w_{23}h_2| \leq 1$.

$$h_3 = \frac{w_{13}h_1 + w_{23}h_2}{2} \quad (6)$$

$$h_3 = \begin{cases} 1: & \beta \frac{w_{13}h_1 + w_{23}h_2}{2} \geq \theta_w \\ 0: & \text{otherwise} \end{cases} \quad (7)$$

In this case, if an output is finally obtained from the $RBF_3$, a signal flow is $x^1$, $x^2 \rightarrow RBF_1$, $RBF_2 \rightarrow RBF_3$. This indicates, therefore, that the artificial neural network structure shown in FIG. 4 functions as a feed-forward system.

Out of Equations (6) and (7), in Equation (7), the output of the $RBF_3$ is a binary output (0 or 1). It is considered, therefore, to be able to simulate electric synapse properties for transmitting information between fast synapses such as conditional reflexes. In Equation (6), by contrast, it is considered to be able to simulate chemical synapse properties for making fine adjustment of an organization (see Literature of Daisuke Yamamoto: "No to Kioku no Nazo (Mystery of Brain and Memory)," Kodanshs-Gendai-Shinsho, 1997). According to the Literature (No to Kioku no Nazo), the $RBF_3$ "receives information from both a neuron reactive only to a visual stimulus and a neuron reactive only to an auditory stimulus, and functions to create an overall image of a subject," simulates the role of a brain cell that integrates a plurality of senses, or simulates the role of a cell like "gestalt" referred to in the field of philosophy.

When the $RBF_3$ is applied with the input vector $\underline{x}^3$ input from the sensor or the like and activated first, or when the $RBF_3$ is activated by the activation of nodes connected to the $RBF_3$ through the weights in the semantic network in the process of a thinking mechanism and a language processing first, the RBF elements $h_1$ and $h_2$ are activated in succession according to the same rule represented by Equation (6) or (7).

In this case, the signal flow is $x^3 \rightarrow RBF_3 \rightarrow RBF_1$, $RBF_2$. Therefore, the artificial neural network structure shown in FIG. 4 functions as a feedback system. If the function of such a feedback system is applied so that, for example, "when the $RBF_1$ and $RBF_2$ connected to the $RBF_3$ through the weights are activated, the $RBF_1$ and $RBF_2$ output respective centroid vectors $\underline{c}_1$ and $\underline{c}_2$ held therein simultaneously," then it is possible to restore the input based on the output of the neural network and to fetch the restored input. Specifically, features of both a voice (auditory information) and a face (visual information) of a mother, for example, can be simultaneously fetched by association of a word "mother."

(Tree-Like Network)

Figure 5:
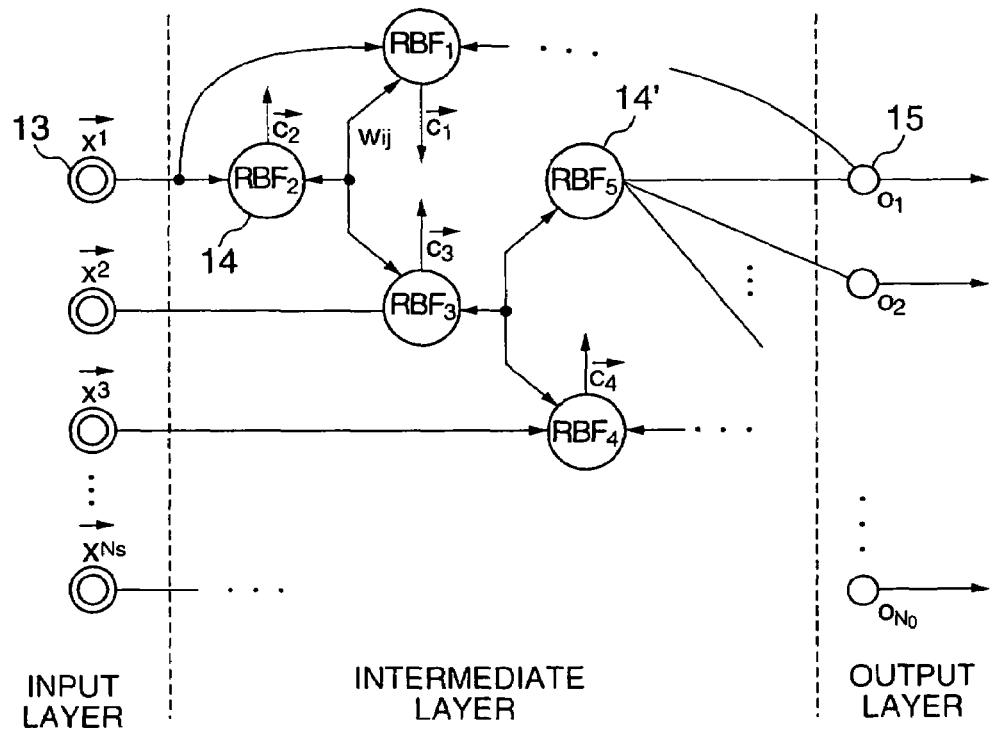
FIG. 5 depicts yet another example of the artificial neural network structure constructed in the neural network unit in the interconnecting neural network system shown in FIG. 1.

FIG. 5 depicts yet another example of the artificial neural network structure constructed in the neural network unit 11 shown in FIG. 1. The artificial neural network structure shown in FIG. 5 is a further development of the artificial neural network structure shown in FIGS. 2 and 4, and constitutes a tree-like network employed in a decision tree. The artificial neural network structure shown in FIG. 5 includes not only the RBF elements 14 ($RBF_1$, $RBF_2$, $RBF_3$, $RBF_4$, ...) into which respective input vectors are input, but also an RBF element 14' ($RBF_5$) (a neuron which does not handle a sensory input vector and which performs only information integration) into which an input vector is not directly input.

(Lattice-Like Network)

Figure 6:
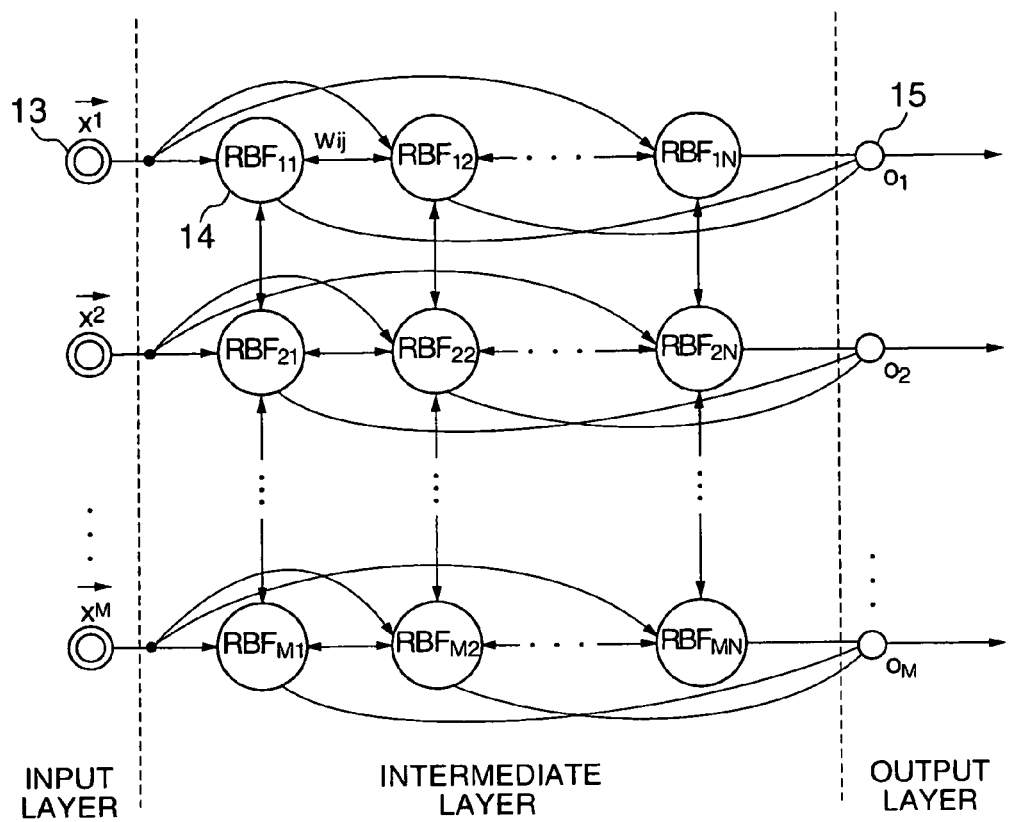
FIG. 6 depicts still example of the artificial neural network structure constructed in the neural network unit in the interconnecting neural network system shown in FIG. 1.

FIG. 6 depicts still another example of the artificial neural network structure constructed in the neural network unit 11 shown in FIG. 1. The artificial neural network structure shown in FIG. 6 is a further development of the artificial neural network structure shown in FIGS. 2 and 4, and constitutes a lattice-like network that simulates a self-organizing feature map ("SOFM") (see Literature of T. Kohonen: "The self-organizing map", Proc. IEEE, vol. 78, pp. 1464-1480, 1990) or the like. This artificial neural network structure is effective to simulate a visual system column structure as seen in a retina.

(Layered Network)

Figure 7:
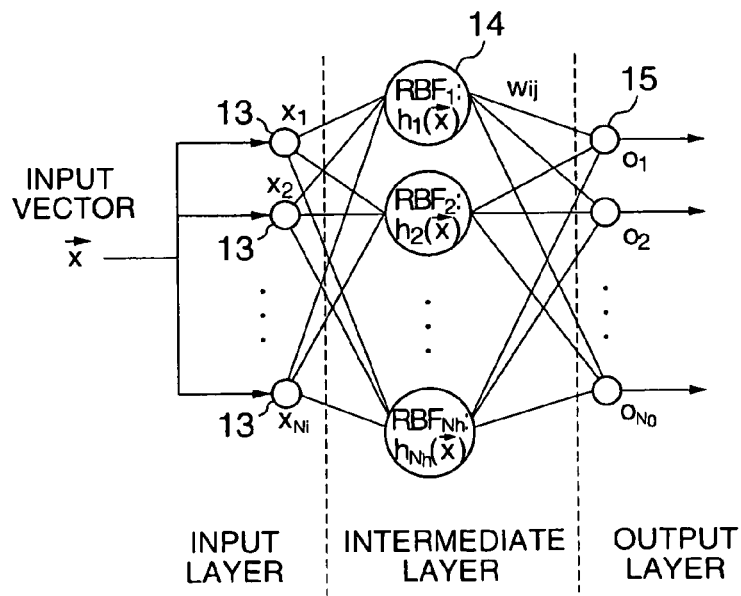
FIG. 7 depicts still example of the artificial neural network structure constructed in the neural network unit in the interconnecting neural network system shown in FIG. 1.

FIG. 7 depicts still another example of the artificial neural network structure constructed in the neural network unit 11 shown in FIG. 1. The artificial neural network structure shown in FIG. 7, differently from the artificial neural network structures shown in FIGS. 2 and 4 to 6, constitutes a conventional layered neural network using the RBF elements 14 shown in FIG. 3.

If a three-layered neural network shown in FIG. 7 is to be constructed, pointer information on the RBF elements 14 ($RBF_i$, where i=1, 2, ..., $N_h$) is represented by the following Equation (8).

$$p_{hi,1} = o_1, p_{hi,2} = o_2, \ldots, \text{and } p_{hi,No} = o_{No} \quad (8)$$

The layered neural network shown in FIG. 7 is a single-modal-input multiple-output ("SIMO") system that inputs a single input vector $\underline{x} = [x_1, x_2, \ldots, x_{Ni}]^T$ and that outputs a plurality of outputs (scalars) $o_1, o_2, \ldots,$ and $o_{No}$. If it is assumed herein that the RBF elements 14 ($RBF_1$, $RBF_2$, ..., and $RBF_{Nh}$) serving as the intermediate layer neurons are connected to the output layer neurons 15 ($o_1, o_2, \ldots,$ and $o_{No}$) through weights $w_{ij}$ in a real-time interconnecting form shown in FIG. 7, the outputs $o_j$ (j=1, 2, ..., $N_o$) are represented by the following Equations (9), (10), and (11). In Equations (9), (10), and (11), $h_1$ denotes the excitation strength of the RBF main body unit 16 of the RBF element 14 ($RBF_i$), $w_{ij}$ denotes a weight for connecting the $j^{th}$ output layer neuron 15 ($o_j$) to the RBF element 14 ($RBF_j$), and $N_h$ denotes the number of RBF elements 14 ($RBF_i$). In addition, $\underline{c}_i$ denotes the centroid vector of the RBF element 14 ($RBF_i$) and $\sigma_i$ denotes a radius.

$$o_j = 1/\delta_j \sum_{i=1}^{Nh} w_{ij} h_i(\vec{x}) \quad (9)$$

$$h_i(\vec{x}) = \exp\left(-\frac{\|\vec{x} - \vec{c}_i\|_2^2}{\sigma_i^2}\right) \quad (10)$$

$$\delta_j = \sum_{i=1}^{Nh} h_i(\vec{x}) \quad (11)$$

Alternatively, the outputs $o_j$ (j=1, 2, . . . , $N_o$) may be obtained not by calculating a sum of the outputs of the RBF elements 14 ($RBF_1$, $RBF_2$, . . . , and $RBF_{Nh}$) but by calculating a maximum of the excitation strengths of the RBF elements 14 ($RBF_1$, $RBF_2$, . . . , and $RBF_{Nh}$) connected to the output layer neurons 15 ($o_1$, $o_2$, . . . , and $o_{No}$). If so, the outputs $o_j$ (j=1, 2, . . . , $N_o$) are represented by the following Equation (12).

$$o_j = \max(w_{ij} h_i(\underline{x})) \quad (12)$$

The function of the interconnecting neural network system 10 shown in FIGS. 1 to 7 will next be described.

<Constructing Artificial Neural Network Structure>

An artificial neural network structure realizing dynamic pattern recognition is constructed first in the interconnecting neural network system 10 shown in FIG. 1, by allowing the network control unit 12 to control the neural network unit 11, and by appropriately adding or deleting the RBF elements 14 based on a plurality of input vectors $\underline{x}^1$, $\underline{x}^2$, . . . , and $\underline{x}^n$ applied from the outside in the neural network unit 11.

Specifically, the artificial neural network structure is constructed according to the following steps 1 and 2.

Step 1: If the number M of the RBF elements is smaller than an upper limit $M_{max}$, the RBF element having the excitation strength $h_i$ calculated by Equation (1) and the centroid vector $\underline{c}_i = \underline{x}$ is added to the neural network unit 11.

Step 2: Otherwise, a minimum excitation strength (e.g., the excitation strength $h_j$ of the $j^{th}$ RBF element) of a centroid of the RBF element satisfies $h_j$<th, the RBF element is replaced by a new RBF element having a centroid vector of $\underline{c}_j = \underline{x}$.

At this moment, the RBF elements 14 relating to one another among all of the RBF elements 14 are interconnected using the pointer units 17 of the respective RBF elements 14 based on an order of the RBF elements 14 that are either added or excited at time series in relation to the input vectors $\underline{x}^1$, $\underline{x}^2$, . . . , and $\underline{x}^n$ applied from the outside.

Specifically, if the $RBF_1$ is added or excited at a certain time $t=t_1$ and that the $RBF_2$ is then added or excited at a time $t=t_2$, for example, the pointer information $p_{1,1}$ on the $RBF_1$ that is added or excited at the time $t_1$ one time before the time $t_2$ is set at a value indicating an address of the $RBF_2$ added or excited after the $RBF_1$. At the same time, the pointer information $p_{2,1}$ is set at a value indicating an address of the $RBF_1$. Likewise, if the $RBF_1$ is excited again and the other RBF element (e.g., $RBF_3$) is added or excited right after the $RBF_1$, then the second pointer information $p_{1,2}$ on the $RBF_1$ is set at a value indicating an address of the $RBF_3$ added or excited after the $RBF_1$ and the pointer information $p_{3,1}$ on the $RBF_3$ is set at a value indicating the address of the $RBF_1$.

Further, while the RBF elements 14 relating to one another are interconnected, the weights are set using the weight holding units 18 of the respective RBF elements 14.

Figure 8:
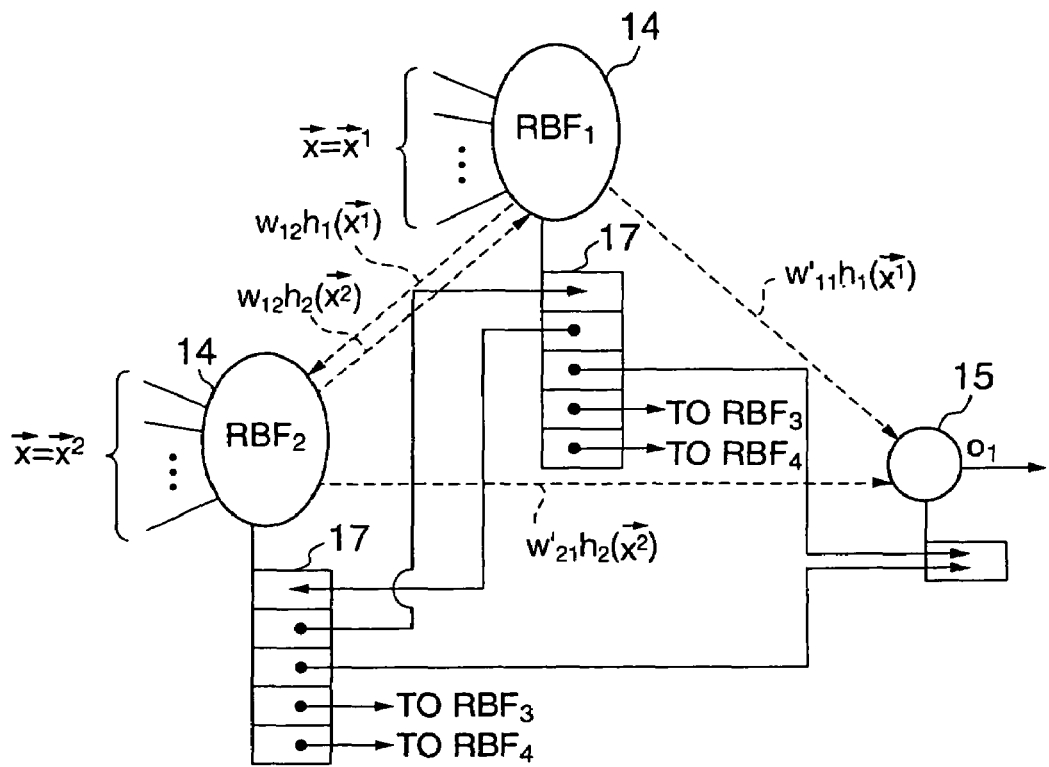
FIG. 8 is a typical view for explaining a method of constructing the artificial neural network structure shown in FIG. 2.

Specifically, as shown in FIG. 8, for example, if the $RBF_1$ and the $RBF_2$ are connected to each other, the first weight $w_{1,1}$ of the $RBF_1$ and the first weight $w_{2,1}$ of the $RBF_2$ are set at weights for connecting the $RBF_1$ to the $RBF_2$.

<Training of Weights Between RBF Elements>

In the process of constructing the artificial neural network structure in the neural network unit 11 as stated above, the weights between the RBF elements 14 maybe trained based on the excitation strengths of the respective RBF elements 14 using the activation time holding units 20 of the respective RBF elements 14.

Specifically, it is assumed that the weight between the RBF elements 14 is based on expansion of Hebb's postulate (see Literature of D. O. Hebb, "The Organization of Behavior," John Wiley & Sons, New York, 1949). Namely, "if two RBF elements connected to each other through a weight are both excited in a certain period $p_1$ and the excitation strength exceeds a threshold given by a certain evaluation function, the value of the weight is increased. Conversely, if one of the two RBF elements is not excited or neither of the two RBF elements are excited in a certain period $p_2$, the value of the weight is decreased."

(First Algorithm for Updating Weight)

Specifically, the following algorithm (first algorithm) can be used.

(1) If both excitation times $\epsilon_i$ and $\epsilon_j$ of the two RBF elements (e.g., $RBF_i$ and $RBF_j$ (i≠j)) exceed a certain threshold $\theta_{p1}$, i.e., if the both excitation times $\epsilon_i$ and $\epsilon_j$ satisfy the following Equation (13), the weight $w_{ij}$ is set according to the following Equation (14) (where $\Delta_1 w_{ij}$>0).

$$\epsilon_i \geq \theta_{p1}, \epsilon_j \geq \theta_{p1} \quad (13)$$

$$\begin{aligned} w_{ij} &= w_{ij} + \Delta_1 w_{ij}: \quad \text{if } w_{ij} \text{ is present} \quad (14)\\ &= w_{ij,max}: \quad \text{if } w_{ij} > w_{ij,max}\\ &= w_{init}: \quad \text{if } w_{wj} \text{ is not present} \end{aligned}$$

(2) Conversely, if one of the $RBF_i$ and $RBF_j$ does not satisfy Equation (13) or neither $RBF_i$ nor $RBF_j$ satisfy Equation (13) in the certain period $p_2$, the weight $w_{ij}$ is set according to the following Equation (15) (where $\Delta_2 w_{ij}$>0).

$$\begin{aligned} w_{ij} &= w_{ij} - \Delta_2 w_{ij}: \text{ if } w_{ij} > w_{init}\\ &\text{Delete } w_{ij}: \text{ otherwise} \quad (15) \end{aligned}$$

(3) If the RBF element is not connected to the other RBF element in a period $p_3$ (<<$p_1$, $p_2$), the RBF element is removed from the neural network.

(Second Algorithm for Updating Weight)

The following second algorithm may be used in place of the first algorithm. The second algorithm is based on the following two conjectures (Conjecture 1 and Conjecture 2) drawn from one of Hebb's postulates, i.e., "when an axon of a neuron A is near enough to excite a neuron B and iteratively or persistently takes part in exciting it, some growth process or metabolic change takes place in one or both neurons A and B such that A's efficiency, as one of the neurons exciting B, is increased" through neuropsychological considerations.

Conjecture 1: When a pair of RBF elements are excited repeatedly, a new weight is formed between these RBF elements. If this occurs periodically, the value of the weight is increased. (Note that in Conjecture 1, the adjacency relationship between the neurons A and B in the Hebb's postulate stated above is not considered for the following reasons. First, if an algorithm to be described later is actually implemented on hardware (e.g., a memory system of a robot), it is not always necessary to consider the positional relationship between the RBF elements. Second, the Hebb's postulate implies that the excitation of the neuron A may occur due to the excitation of the other neurons connected to the neuron A via synapses. This second reason leads to Conjecture 2.

Conjecture 2: When one RBF element is excited and one of the weights is connected to the other RBF element, the excitation of the one RBF element is transferred to the other RBF element via the weight. However, the excitation strength transferred to the other RBF element depends on the value of the weight.

The second algorithm for updating the weights between the RBF elements is given based on Conjectures 1 and 2 as follows.

(1) If the weight $w_{ij}$ is already established between a pair of RBF elements (e.g., $RBF_i$ and $RBF_j$ (i≠j)), the value of the weight is decreased according to the following Equation (15-1).

$$w_{ij} = w_{ij} \cdot \exp(-\xi_i) \quad (15\text{-}1)$$

(2) If the subsequent excitation of a pair of RBF elements (e.g., $RBF_i$ and $RBF_j$ (i≠j)) occurs (i.e., when the excitation strength is above a predetermined threshold ($RBF_i \geq \theta_k$) and is repeated p times, the weight $w_{ij}$ is set according to the following Equation (15-2).

$$
\begin{aligned}
w_{ij} &= w_{init}: && \text{if } w_{ij} \text{ is not present} \\
&= w_{ij,max}: && \text{if } w_{ij} > w_{ij,max} \\
&= w_{ij} + \delta: && \text{otherwise}
\end{aligned}
\quad (15\text{-}2)
$$

(3) If the excitation of the RBF element ($RBF_i$) does not occur during a certain period $p_1$, the $RBF_i$ and all the weights $\underline{w}_i$ (=$[w_{i1}, w_{i2}, \ldots]$) connected to the $RBF_1$ are removed from the neural network (thus, representing the extinction of the RBF element serving as a neuron).

In Equations (15-1) and (15-2), $\xi$, $w_{init}$, $w_{ij,max}$, and $\delta$ are all positive constants.

The processings (1) and (2) agree with the following postulates (i) and (ii) that rephrase Hebb's postulate more specifically.

(i) If two neurons on either side of a synapse are excited asynchronously, the strength of the synapse is selectively weakened or the synapse is removed itself.

(ii) If two neurons on either side of a synapse are excited simultaneously (i.e., synchronously), the strength of the synapse is selectively increased.

In the processing (1), a decaying factor $\xi_i$ is introduced for the update of the weight so as to agree with the rephrasing postulates (i) and (ii), whereby the decay or extinction of the synapse can be simulated.

The postulates (i) and (ii) stated above can be extended and interpreted such that (a) the decay of the synapse always occurs in a short period of time though the amount of such decay is relatively small and (b) the decay of the synapse also occurs when the other neuron(s) is/are excited due to the excitation of one neuron.

The postulate (a) is represented by the decay factor $\xi_i$ of the weight $w_{ij}$. The postulate (b) is under the assumption that the potential of the other side of the synapse is (slightly) lower than that of one side of the synapse. At neuro-anatomical level, it is known that a similar situation occurs due to change in the transmission rate of spike pulses or decay represented by long-term depression (LTD) or the like. These can lead to modification of the above rephrasing postulates (i) and (ii) and the following Conjecture 3.

Conjecture 3: When the RBF element ($RBF_i$) is excited by the input vector $\underline{x}$ and the $RBF_i$ is connected to the other RBF element ($RBF_j$) via the weight $w_{ij}$, the excitation strength $h_j$ of the $RBF_j$ is computed by the following Equation (15-3).

$$h_j(\underline{x}) = \gamma w_{ij} I_i \quad (15\text{-}3)$$

In Equation (15-3), $\gamma$ denotes the decay factor and $I_i$ denotes an indicator function represented by the following Equation (15-4).

$$
\begin{aligned}
I_i &= 1: && \text{if the } RBF_i \text{ is excited (i.e., if } h_i \geq \theta_k) \\
&= 0: && \text{otherwise}
\end{aligned}
\quad (15\text{-}4)
$$

In Equations (15-3) and (15-4), the indicator function $I_i$ simulates the situation in which a spike pulse (or an action potential) generated in the $RBF_i$ due to the excitation of the $RBF_i$ is transferred to the other $RBF_j$ via the synapse. Equations (15-3) and (15-4) indicate that, apart from the regular input vector $\underline{x}$, each RBF element serving as a neuron can be excited by a secondary input (i.e., the transfer of excitation from other neurons) differently from the conventional neural network.

(Third Algorithm for Updating Weight)

Figure 10:
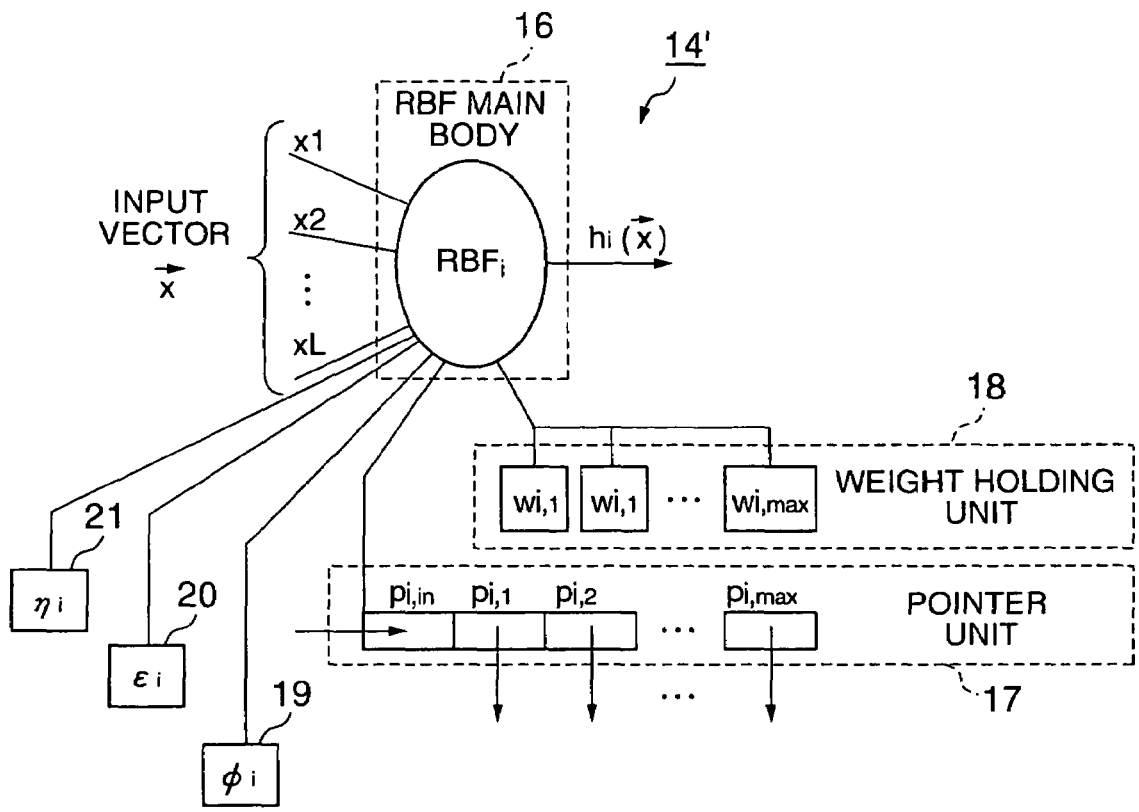
FIG. 10 depicts the configuration of a modification of the RBF element (neuron) used in the neural network unit shown in FIG. 2.

The second algorithm can be modified to the following third algorithm. This third algorithm is on the assumption of the use of RBF elements used in <CONSTRUCTING SELF-ORGANIZING NEURAL NETWORK STRUCTURE> to be described later (i.e., RBF elements 14" each having a class label holding unit 21 that holds a class label $\eta_i$ relating to the final output, as shown in FIG. 10).

Specifically, contents of the third algorithm are as follows.

(1) If the weight $w_{ij}$ is already established between a pair of RBF elements (e.g., $RBF_i$ and $RBF_j$ (i≠j)), the value of the weight is decreased according to the following Equation (15-5).

$$w_{ij} = w_{ij} \cdot \exp(-\xi_i) \quad (15\text{-}5)$$

(2) If the subsequent excitation of a pair of RBF elements (e.g., $RBF_i$ and $RBF_j$ (i≠j)) occurs (i.e., when the excitation strength is above a predetermined threshold ($RBF_i$, $RBF_j \geq \theta_k$) and is repeated p times, and class labels $\eta_i$ and $\eta_j$ of the respective $RBF_i$ and $RBF_j$ are identical, then the weight $w_{ij}$ is set according to the following Equation (15-6).

$$
\begin{aligned}
w_{ij} &= w_{init}: && \text{if } w_{ij} \text{ is not present} \\
&= w_{ij,max}: && \text{if } w_{ij} > w_{ij,max} \\
&= w_{ij} + \delta: && \text{otherwise}
\end{aligned}
\quad (15\text{-}6)
$$

(3) If the excitation of the RBF element ($RBF_i$) does not occur during a certain period $p_1$, the $RBF_i$ and all the weights $\underline{w}_i$ (=$[w_{i1}, w_{i2}, \ldots]$) connected to the $RBF_i$ are removed from the neural network (thus, representing the extinction of the RBF element serving as a neuron).

In Equations (15-5) and (15-6), $\xi$, $w_{init}$, $w_{ij,max}$, and $\delta$ are all positive constants.

<Determination of Duration of RBF Element>

In the process of constructing the artificial neural network structure in the neural network unit 11 as stated above, each RBF element 14 may be removed at a predetermined timing determined based on the excitation strength of the RBF element 14 using the duration variable holding unit 19 of the RBF element 14.

Specifically, a variable $\phi_i$ for determining the duration of the $i^{th}$ RBF element ($RBF_i$) is defined as represented by the following Equation (16) using a function (e.g., an exponential decaying function) that monotonically decreases according to a time $t_i$ (where a>0 and $t_i \geqq 0$).

$$\phi_i = \exp(-a \cdot t_i) \tag{16}$$

In the variable $\phi_i$ defined as represented by Equation (16), the value of "a" that is a factor for determining the amount of decrease is updated according to the following Equation (17) if the output of the $i^{th}$ RBF element 14 ($RBF_i$) exceeds a predetermined threshold $\theta_{out}$ during a predetermined period ($T_1 \leqq t \leqq T_2$) based on the time t (where $\delta_a > 0$). At the same time, the time $t_i$ used in Equation (16) is initialized.

$$a = a - \delta_a: \quad \text{if } a \geq \theta_a \tag{17}$$
$$= \theta_a: \quad \text{otherwise}$$

In the variable $\phi_i$ thus sequentially updated, if $\phi_i$ satisfies $\phi_i > \theta_\phi$ (where $\theta_\phi$ is an arbitrary threshold) when $t_i = T_2 - T_1$, then the $i^{th}$ RBF element 14 ($RBF_i$) is removed from the network control unit 11.

In Equations (16) and (17), the update period of the factor "a" is limited to a period between $t+T_1$ and $t+T_2$. This is because an element of practice that is a psychological concept is considered. By setting such a constant delay, the RBF element can be efficiently trained (see Literature of Daisuke Yamamoto, "No to Kioku no Nazo (Mystery of Brain and Memory)," Kodanshs-Gendai-Shinsho, 1997).

<Outputs of Neural Network in Consideration of Delay Element>

The outputs $o_j$ (j=1, 2, . . . , $N_o$) of the artificial neural network structure constructed in the neural network unit 11 are obtained according to Equations (1), (2), (3), and (4) stated above. Alternatively, variations in the excitation strengths output from the RBF elements 14 serving as intermediate layer neurons may be output as outputs in a time sequence manner.

Specifically, a first output form can be obtained by using a method of comprising the steps of: calculating excitation strengths of the respective RBF elements 14 during a certain period T; collecting first to $N^{th}$ highest strengths (where N<T) in the form of vectors according to the following Equations (18) to (20); and setting the vectors as final outputs.

$$\underline{o}_j = [o_j(1), o_j(2), \ldots, o_j(N)]^T \tag{18}$$

In Equation (18), $o_j(l)$ (where l=1, 2, . . . , N) satisfies the following Equations (19) and (20).

$$o_j(l) = \text{sort}(\max(\theta_{ij}(t))) \tag{19}$$

$$\theta_{ij}(t) = w_{ij} h_i(\underline{x}(t)) \tag{20}$$

In Equations (19) and (20), i denotes indices of all RBF elements connected to the $j^{th}$ output layer neuron via the weight $w_{ij}$, and t satisfies t=0, 1, . . . , T−1 (time), and sort (·) denotes a function for sorting in a descending order.

A second output form can be obtained by using a method of outputting excitation strengths of the respective RBF elements 14 during the certain period T as scalars according to the following Equations (21) and (22).

$$o_j = f(\underline{\theta}_{ij}) \tag{21}$$

In Equation (21), $\underline{\theta}_{ij}$ satisfies the following Equation (22).

$$\underline{\theta}_{ij} = [\theta_{ij}(0), \theta_{ij}(1), \ldots, \theta_{ij}(T-1)]^T \tag{22}$$

In Equation (21), f(·) may be, for example, a cumulative function in a sigmoidal form and may be given according to the following Equation (23) (where b is a positive constant).

$$f(\vec{\theta}_{ij}) = \frac{1}{1 + \exp\left(-b \sum_{t=0}^{T-1} \theta_{ij}(t)\right)} \tag{23}$$

If variations in the excitation strengths output from the respective RBF elements serving as intermediate layer neurons are output in time sequence in accordance with the first and second output forms, then each RBF element 14 exploits centroid data in a matrix form in consideration of time sequence variations with a centroid vector of the RBF element 14 set as $\underline{c}_i$. A centroid matrix $\underline{C}_i$ ($N_i \times T$) of the $i^{th}$ RBF element 14 ($RBF_i$) is represented by the following Equation (24).

$$C_i(t) = \begin{bmatrix} c_1(t) \\ c_2(t) \\ \vdots \\ c_{N_i(t)} \end{bmatrix} = \begin{bmatrix} c_1(0) & c_1(1) & \cdots & c_1(T-1) \\ c_2(0) & c_2(1) & \cdots & c_2(T-1) \\ \vdots & \vdots & \ddots & \vdots \\ c_{N_i}(0) & c_{N_i}(1) & \cdots & c_{N_i}(T-1) \end{bmatrix} \tag{24}$$

Figure 9:
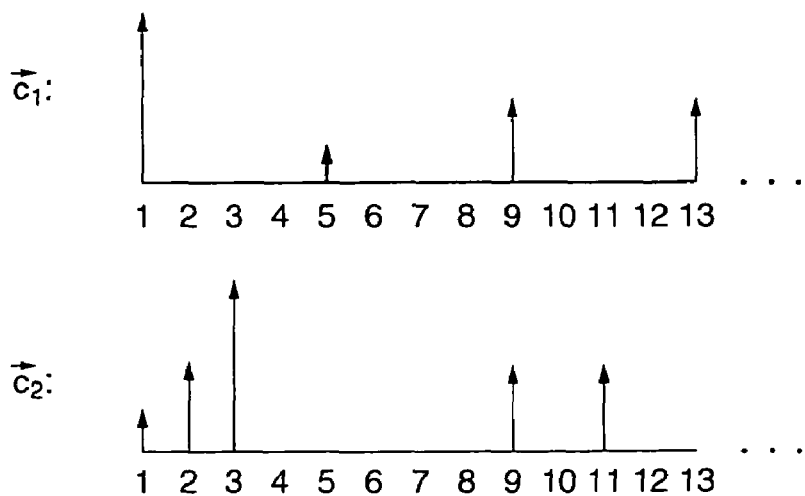
FIG. 9 is a typical view for explaining centroid data in a matrix form used in the RBF element (neuron) included in the artificial neural network structure shown in FIGS. 2 and 4 to 7.

In Equation (24), if first two rows (i.e., $\underline{c}_1$ and $\underline{c}_2$) of the centroid matrix $\underline{C}_i$ are given below:

$$\underline{c}_1 = [2\ 0\ 0\ 0\ 0.5\ 0\ 0\ 0\ 1\ 0\ 0\ 0\ 1\ \ldots\ ]$$

$$\underline{c}_2 = [0.5\ 1\ 2\ 0\ 0\ 0\ 0\ 0\ 1\ 0\ 1\ 0\ 0\ \ldots\ ],$$

where pulse trains of $\underline{c}_1$ and $\underline{c}_2$ are those as shown in FIG. 9.

In the first and second output forms, the final outputs of the neural network are given asynchronously. Therefore, if the output of every RBF element 14 is assumed as a pulse output from a neuron as a spike in terms of cerebrophysiology, it is possible to store information between a plurality of RBF elements 14 using variations in the magnitude of pulses and in the time length between the pulses. Thus, a storage system such as a so-called pulsed neural network (see Literature of J. E. Dayhoff and G. L. Gerstein, "Favored patterns in nerve spike trains I. Detection," J. Neurophys, 49(6), pp. 1334-1348, 1983) or a so-called time delay neural network ("TDNN") (see Literature of K. J. Lang and G. E. Hinton, "The development of time-delay neural network," Technical Report CUM-CS-88-152, Carnegie-Melon Univ., Pittsburgh, Pa., 1988) can be realized.

If the artificial neural network structure in consideration of such delay elements is applied to a system, a recognition system such as a database incremental search function, that narrows down final candidates with the passage of time can be constructed. Specifically, this artificial neural network structure can be applied to the construction of, for example, a thinking mechanism for automatically composing or estimating a complete sentence or song from a first word sequence or a phrase in the song.

<Constructing Self-Organizing Neural Network Structure>

The process of appropriately updating the weights between the RBF elements in any one of the artificial neural network structures as shown in FIGS. 4 to 7 by the training in the neural network unit 11 of the interconnecting neural network system 10 has been mainly described so far. Alternatively or quite naturally, the neural network structure (self-organizing neural network structure) can be constructed (self-organized) by autonomously (in an unsupervised manner) performing the addition of the RBF element and the connection between the RBF elements (the formation of the weights between the RBF elements and the update of values of the weights between the RBF elements) based on a plurality of input vectors $\underline{x}^1, \underline{x}^2, \ldots,$ and $\underline{x}^n$ in a state in which no RBF element serving as a neuron is present at all in the neural network unit 11. The RBF elements in the self-organizing neural network structure thus constructed may have a single modality (e.g., an auditory modality or a visual modality) or the RBF elements may have a plurality of different modalities (e.g., both the auditory modality and the visual modalities).

A method of constructing such a self-organizing neural network structure will now be described in detail. It is assumed herein that as each RBF element ($RBF_i$) in the self-organizing neural network structure, such an RBF element as the RBF element 14" shown in FIG. 10 that includes the class label holding unit 21 that holds the class label $\eta_i$ relating to final outputs is used.

(Construction Phase of Self-Organizing Neural Network Structure)

A construction phase (or training phase) of the self-organizing neural network structure will first be described.

Step 1: As a first step (cnt=1), an RBF element, which has a first input vector $\underline{x}(1)$ input from the outside as a centroid vector $\underline{c}_1$ of an RBF, is added into the self-organizing neural network structure as a new neuron based on the first input vector $\underline{x}(1)$.

Step 2: As a second step, processings in the following steps 2.1 to 2.3 are repeatedly performed from cnt=2 up to cnt={total number of input vectors}.

Step 2.1:

(i) Based on the input vector $\underline{x}(cnt)$ input from the outside, the excitation strength of every RBF element ($RBF_i$) in the self-organizing neural network structure is calculated. If $h_i(\underline{x}(cnt)) \geq \theta_k$, the $RBF_i$ is excited.

(ii) The excitation strength $h_j$ of the $RBF_j$ connected to the $RBF_i$ via the weight $w_{ij}$ is checked according to the principles of excitation based on the weights (link weights) between the RBF elements (e.g., Equations (15-3) and (15-4)) If $h_j(\underline{x}(cnt)) \geq \theta_k$, the $RBF_j$ is excited.

(iii) All the RBF elements determined to be excited in (i) and (ii) above are marked.

Step 2.2: If no RBF element ($RBF_i$) excited by the input vector $\underline{x}(cnt)$ input from the outside is present in the self-organizing neural network structure, an RBF element, which has the input vector $\underline{x}(cnt)$ as the centroid vector of the RBF, is added into the self-organizing neural network structure as a new neuron.

Step 2.3: Weights $w_{ij}$ that connect the RBF elements ($RBF_i$) to each other are formed and/or formed weights $w_{ij}$ are updated (trained) based on the excitation strength $h_i$ of each RBF element ($RBF_i$) in the self-organizing neural network structure in accordance with any one of the first to third algorithms for updating the weights stated above.

In the step 2.3, as described in relation to the first to third algorithms, a processing for removing the RBF element ($RBF_i$) which is determined unnecessary based on the excitation strength $h_i$ of each RBF element ($RBF_i$) in the self-organizing neural network structure may be performed. In the step 2.3, as described in relation to the third algorithm, the weights $w_{ij}$ that connect the RBF elements ($RBF_i$) to each other are formed and/or the formed weights $w_{ij}$ are updated (trained) based on the excitation strength $h_i$ of each RBF element ($RBF_i$) only if the class labels of the RBF elements ($RBF_i$) in the self-organizing neural network structure are identical.

(Testing Phase of Self-Organizing Neural Network Structure)

A testing phase of the self-organizing neural network structure will next be described.

Step 1:

(i) The input vector $\underline{x}(cnt)$ (cnt=1 to {total number of input vectors}) input from the outside is input into the self-organizing neural network structure, and the excitation strength $h_i$ of every RBF element ($RBF_i$) is calculated. If $h_i(\underline{x}(cnt)) \geq \theta_k$, the $RBF_i$ element is excited.

(ii) The excitation strength $h_j$ of the $RBF_j$ connected to the $RBF_i$ via the weight $w_{ij}$ is checked according to the principles of excitation based on the weights (link weights) between the RBF elements (e.g., Equations (15-3) and (15-4)) If $h_j(\underline{x}(cnt)) \geq \theta_k$, the $RBF_j$ is excited.

(iii) All the RBF elements determined to be excited in (i) and (ii) above are marked.

Step 2:

(i) The maximum excitation strength $h_{max}(=max(h_i(\underline{x})))$ of the maximally excited RBF element is obtained among all the marked RBF elements in the self-organizing neural network structure.

(ii) Thereafter, if the object of constructing the self-organizing neural network structure is to perform some recognition processing, a result of the recognition is output simply by outputting a class label $\eta_{max}$ from the class label holding unit 21 (see FIG. 10) provided in the RBF main body unit 16 of the target RBF element 14".

The construction (training) phase and the testing phase have been described while assuming that each RBF element ($RBF_i$) in the self-organizing neural network structure holds the class label $\eta_i$ relating to final outputs. Alternatively, a special RBF element (i.e., class label RBF element) that represents a class label maybe separately prepared and connected to the target RBF element instead of allowing each RBF element to hold the class label $\eta_i$. In the latter case, the result of recognition by the self-organizing neural network structure is output by checking the excitation strength of the class label RBF element connected to the target RBF element.

Specifically, an algorithm for the latter case is as follows.

(1) A new RBF element is formed in the self-organizing neural network structure (note that no weight generated from this new RBF element is present at this point).

(2) An RBF element that represents a new category (class label) is added into the self-organizing neural network structure as a new RBF element after a few times of this point.

(3) A new RBF element added thereafter is connected to the RBF element that represents the new category (class label) via a weight.

As can be understood, according to this embodiment, the artificial neural network structure is constructed by interconnecting the RBF elements 14 relating to each other among the RBF elements 14 in the neural network unit 11 via the weight under control of the network control unit 12. Each RBF element 14 outputs the excitation strength $h_i$ according to the similarity between the input vector $\underline{x}$ and the centroid vector $\underline{c}_i$ based on the RBF when the RBF element 14 is activated by the input vector $\underline{x}$ applied from the outside. The RBF element 14 also outputs the pseudo excitation strength $h_i$ obtained based on the excitation strength $h_k$ output from the other RBF element 14 when the RBF element 14 is excited in a chain reaction to the excitation of the other RBF element 14 connected to the RBF element 14. Therefore, one RBF element 14 can belong to a plurality of networks, and a plurality of RBF elements 14 can be connected in an arbitrary network form. Accordingly, differently from the conventional fixed network form in which a single input vector is input, a plurality of input vectors can be freely handled, and the configuration change and the like can be flexibly made. In this case, since the RBF element 14 can belong to a plurality of networks having different modalities, it is possible to freely handle input vectors having a plurality of different modalities such as the auditory modality and the visual modality, and to widely apply the system not only to single-domain pattern recognition but also to multi-domain pattern recognition.

According to this embodiment, each weight that connects the RBF elements 14 to each other in the neural network unit 11 is updated and thereby trained under control of the network control unit 12. This, therefore, facilitate additionally training the artificial neural network structure.

According to this embodiment, each weight that connects the RBF elements 14 to each other can be updated independently of the outputs of the RBF elements 14 in the neural network unit 11. Therefore, differently from the conventional training algorithm such as the back-propagation method, only the weights stored in a distributed fashion for specifying the connection relationships between the RBF elements 14 can be iteratively updated while locally storing data in the RBF elements 14 in the neural network unit 11 as the centroid vectors without influencing at all the data stored in the respective RBF elements 14 during the training of the weight. Accordingly, it is possible to realize data representations having different properties, i.e., a distribution property and a localization property. As compared with even the classic K-lines (knowledge-line) idea proposed by Minsky (the idea that agents are regarded as nodes of a symbol base and that the nodes are linked by K-lines) (see Literature of M. Minsky, "The Society of Mind," Simon & Schuster, N.Y., 1985), it is possible to construct a memory element that is advantageous, and that possesses both generalization performance and additional training performance.

Further, the artificial neural network structure realized in this embodiment possesses the same properties as those of the general regression neural network ("GRNN") and the probabilistic neural network ("PNN"), and exhibits advantages of facilitating expansion and reduction of the network and of having fewer computational unstable factors.

According to this embodiment, the respective RBF elements 14 ($RBF_i$) in the neural network unit 11 may be set as intermediate layer neurons, which use centroid data in a matrix form in light of changes at time series as centroid vectors $c_i$, and the output layer neurons 15 ($o_j$) may output changes in excitation strengths output from the respective intermediate layer neurons at time series. It is thereby possible to facilitate constructing the recognition system such as a database incremental search function, that narrows down final candidates with the passage of time.

In the embodiment, the instance of using RBF elements each having the RBF as neurons in the artificial neural network structure has been described. As the "neurons in the artificial neural network structure" mentioned herein, arbitrary neurons each capable of outputting the excitation strength according to the similarity between the input vector and the centroid vector based on the kernel function can be used. As the "kernel function" mentioned herein, a function using a norm, a function using an inner product between two vectors, a function using Epanechinikov quadratic or Tricube, or the like is can be used.

In the embodiment, as the centroid vector $c_i$ of each RBF element 14, a feature vector obtained from an image, e.g., a face image, can be used. Further, in view of a more biologically reasonable model, a feature vector, such as a stroke or an edge, that simulates the role of a neuron reactive to a specific image element as clarified by, for example, the study of the primary visual area in cerebral cortex by Hubel et al. (see Literature of D. H. Hubel and T. N. Wiesel, "Receptive fields, binocular and functional architecture in the cat's visual cortex", Journal of Physiology, vol. 160, pp. 106-154, 1962). In the latter case, an artificial neural network structure, which enables a plurality of RBF elements 14 to recognize the image such as a face as a whole, is constructed.

Figure 11:
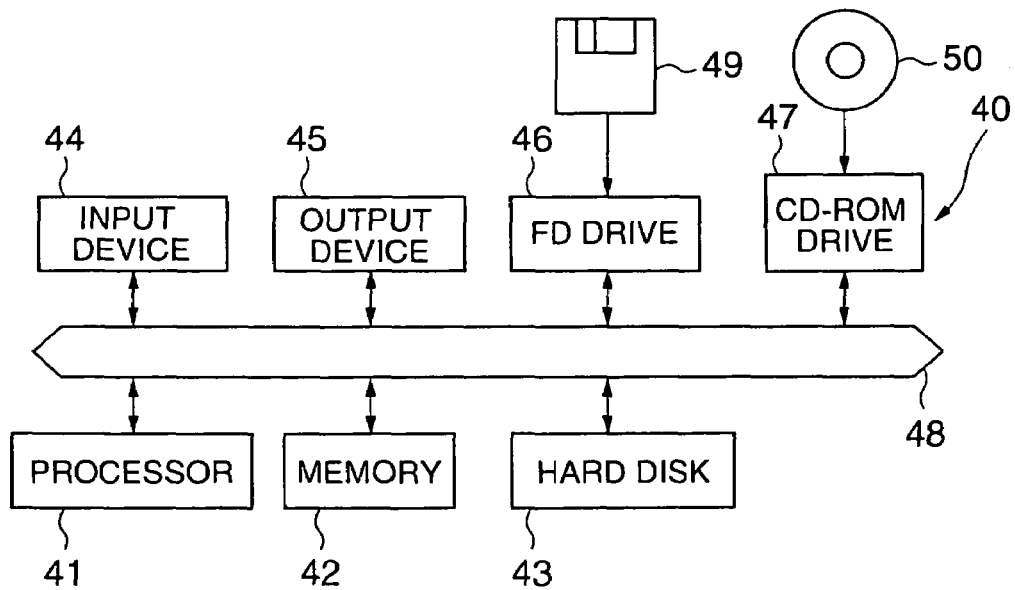
FIG. 11 depicts an example of a computer system to which an embodiment of the present invention is applied.

Furthermore, the interconnecting neural network system 10 according to this embodiment can be realized as hardware by a method of implementing the RBF elements 14 as a programmable array or the like, and can be also realized as a program running on, for example, a computer system 40 shown in FIG. 11. The computer system 40 includes a bus 48, a processor 41 connected to the bus 48, a memory, and a hard disk 43 connected to the bus 48, and peripherals (an input device 44 such as a keyboard and a mouse, an output device 45 such as a display and a printer, an FD drive 46, and a CD-ROM drive 47) connected to the bus 48. The program is stored in a computer readable recording medium such as the memory 42, the hard disk 43, the flexible disk 49, or the CD-ROM 59. By iteratively reading the program from the processor 41 and executing the program, the above-stated procedures can be realized.

EXAMPLES

Specific examples according to the preferred embodiment stated above will be described.

Problem Setting

To see how the self-organizing neural network structure is actually constructed, let us consider solving an XOR problem by means of the self-organizing neural network structure, as a straightforward pattern recognition processing.

As the respective RBF elements in the self-organizing neural network structure, the RBF elements shown in FIG. 10 are employed. It is assumed herein that the RBF main body unit of each RBF element has an RBF with a radius a set at 1.0. In addition, an excitation threshold $\theta_k$ is set at 0.7. It is also assumed herein that four input vectors to the self-organizing neural network structure are $\underline{x}(1)=[0.1, 0.1]^T$, $\underline{x}(2)=[0.1, 1.0]^T$, $\underline{x}(3)=[1.0, 0.1]^T$, and $\underline{x}(4)=[1.0, 1.0]^T$.

In addition, in accordance with the algorithms described in <CONSTRUCTING SELF-ORGANIZING NEURAL NETWORK STRUCTURE>, the self-organizing neural network structure capable of recognizing the four XOR patterns is constructed. Specific procedures are as follows.

(1) cnt=1

The radius $\sigma$ and the excitation threshold $\theta_k$ are initialized to $\sigma=1.0$ and $\theta_k=0.7$. An $RBF_1$ is added as a new RBF element. At this time, the centroid vector $\underline{c}_1$ of the $RBF_1$ is set identical to the input vector $\underline{x}(1)=[0.1, 0.1]^T$ and the class label $\eta_1$ is set at $\eta_1=0$.

(2) cnt=2

An input vector $\underline{x}(2)$ is given to the self-organizing neural network structure (up to now, only the single RBF element ($RBF_1$) is present in the structure).

At this time, the following equation is established.

$$h_1=\exp(-\|\underline{x}(2)-\underline{c}_1\|_2^2/\sigma^2)=0.449$$

Thus, since $h_1(\underline{x}(2))<\theta_k$, a new RBF element $RBF_2$ is added. The centroid vector $\underline{c}_2$ of the $RBF_2$ is set identical to the input vector $\underline{x}(2)=[0.1, 1.0]^T$ and the class label $\eta_2$ thereof is set at $\eta_2=1$.

(3) cnt=3

An input vector $\underline{x}(3)$ is given to the self-organizing neural network structure (up to now, the two RBF elements ($RBF_1$ and $RBF_2$, are present in the structure).

At this time, the following equations are established.

$$h_1 = \exp(-\|\underline{x}(3) - \underline{c}_1\|_2^2 / \sigma^2) = 0.449 (<\theta_k)$$

$$h_2 = \exp(-\|\underline{x}(3) - \underline{c}_2\|_2^2 / \sigma^2) = 0.1979 (<\theta_k)$$

Thus, since no RBF element excited by the input vector $\underline{x}(3)$ is present, a new RBF element $RBF_3$ is added. The centroid vector $\underline{c}_3$ of the $RBF_3$ is set identical to the input vector $\underline{x}(3) = [1.0, 0.1]^T$ and the class label $\eta_3$ thereof is set at $\eta_3 = 1$.

(4) cnt=4

An input vector $\underline{x}(4)$ is given to the self-organizing neural network structure (up to now, the three RBF elements ($RBF_1$, $RBF_2$, and $RBF_3$) are present in the structure).

At this time, the following equations are established.

$$h_1 = \exp(-\|\underline{x}(4) - \underline{c}_1\|(_2^2 / \sigma^2) = 0.1979 (<\theta_k)$$

$$h_2 = \exp(-\|\underline{x}(4) - \underline{c}_2\|_2^2 / \sigma^2) = 0.449 (<\theta_k)$$

$$h_3 = \exp(-\|\underline{x}(4) - \underline{c}_3\|_2^2 / \sigma^2) = 0.449 (<\theta_k)$$

Thus, since no RBF element excited by the input vector $\underline{x}(4)$ is present, a new RBF element $RBF_4$ is added. The centroid vector $\underline{c}_4$ of the $RBF_4$ is set identical to the input vector $\underline{x}(4) = [1.0, 1.0]^T$ and the class label $\eta_4$ thereof is set at $\eta_4 = 0$.

Thus, the self-organizing neural network structure that includes the four RBF elements ($RBF_1$, $RBF_2$, $RBF_3$, and $RBF_4$) is constructed. The self-organizing neural network structure thus constructed can correctly recognize the four input patterns according to the algorithms described in <Testing Phase of Self-Organizing Neural Network>Structure Constructing the self-organizing neural network structure as stated above takes similar steps for the GRNN or the PNN. This is because the four neurons (i.e., RBF elements) are present in one neural network structure and the class labels $\eta_i$ (i=1, 2, 3, 4) can be regarded as target values. (Accordingly, this signifies that PNNs/GRNNs are subclasses of the self-organizing neural network structure.)

However, consider the situation in which another set of input vectors that represent XOR patterns, i.e., $\underline{x}(5) = [0.2, 0.2]^T$, $\underline{x}(6) = [0.2, 0.8]^T$, $\underline{x}(7) = [0.8, 0.2]^T$, and $\underline{x}(8) = [0.8, 0.8]^T$ are subsequently presented, during the construction of the self-organizing neural network structure. Then, a difference from the PNN or the GRNN appears in the structure. Namely, all patterns of these input vectors are trained (i.e., new neurons are added) during the construction phase of the PNN or the GRNN. No redundant RBF element addition is performed during the construction phase of the self-organizing neural network structure. In other words, these four input vector patterns excite only the respective nearest RBF elements (according to the condition of $h_i > \theta_k$), all of which nevertheless yield the correct pattern recognition results, and thus no further RBF elements are added.

As can be understood from this observation, since the input data is locally stored in quite a small number of RBF elements, it is possible to realize a pattern classifier capable of appropriately performing data pruning (or data clustering) by appropriately adjusting the parameters relating to the respective RBF elements.

A parameter adjustment processing for the self-organizing neural network structure will next be discussed while referring to several simulation experiment examples.

First Simulation Experiment Example (Single-Domain Pattern Recognition)

In order to see how the self-organizing neural network structure is constructed (self-organized) in a more realistic situation, a simulation experiment is conducted to single-domain pattern recognition (pattern recognition using several single-domain datasets extracted from public databases). In the PROBLEM SETTING section described above, the connection between the RBF elements in the self-organizing neural network structure (the formation and training of weights between the RBF elements) has not been described. In the first simulation experiment example, the weights between the RBF elements are taken into consideration so as to see how the excitation between the RBF elements via the weights affects the performance of the self-organizing neural network structure. In addition, in the first simulation experiment example, the second algorithm is used as an algorithm for training the weights between the RBF elements. However, the processing (3) of the second algorithm (i.e., removal of the RBF element serving as a neuron) is not considered herein so as to more accurately track the behavior of the self-organizing neural network structure.

(Parameter Setting)

In the first simulation experiment example, three different domain datasets extracted from databases (SFS, OptDigit, and PenDigit) of "UCI Machine Learning Repository" at the University of California are used. These three datasets are independent of one another so as to perform recognition processing, features of which datasets are shown in the following Table 1. The SFS dataset is encoded in advance, and pattern vectors for the recognition processing are given to the SFS dataset.

TABLE 1

Datasets used for the simulation examples

| Dataset | Length of Each Pattern Vector | Total Num. of Patterns in the Training Sets | Total Num. of Patterns in the Testing Sets | Num. of Classes |
|---|---|---|---|---|
| SFS | 256 | 540 | 360 | 10 |
| OptDigit | 64 | 1200 | 400 | 10 |
| PenDigit | 16 | 1200 | 400 | 10 |

Parameters of the RBF elements in the self-organizing neural network structure are selected as summarized in Table 2 below. As shown in Table 2, a combination of parameters are selected so that all of the three datasets have parameters as equal as possible so as to perform simulations in conditions as similar as possible. In order to evaluate excitation for the respective RBF elements (determine whether the excitation strength $h_1$ of each RBF element exceeds the predetermined threshold $\theta_k$) during the construction of the self-organizing neural network structure, the radius $\sigma_i$ and the threshold $\theta_k$ are set at $\sigma_i = \sigma$ ($\forall i$) and $\theta_k = 0.7$, respectively. In the first simulation experiment example, the excitation of the RBF elements via the weights is restricted to the nearest neighbors so as not to lose generality.

TABLE 2

Parameters chosen for the simulation examples

| | Dataset | | | |
|---|---|---|---|---|
| | For Single-Domain Pattern Classification | | | For Dual-Domain Pattern Classification (SFS + |
| Parameter | SFS | OptDigit | PenDigit | PenDigit) |
| Decaying Factor for Excitation: $\gamma$ | 0.95 | 0.95 | 0.95 | 0.95 |
| Unique Radius for RBF (Kernel Function): $\sigma$ | 8.0 | 5.0 | 2.0 | 8.0 (SFS) 2.0 (PenDigit) |
| Link Weight Adjustment Constant: $\delta$ | 0.02 | 0.02 | 0.02 | 0.02 |
| Synaptic Decaying Factor: $\xi_i$ ($\forall i$) | 0.001 | 0.001 | 0.1 | 0.001 |
| Threshold Value for Establishing Link Weights | 5 | 5 | 5 | 5 |
| Initializing Value for Link Weights: Winit | 0.7 | 0.7 | 0.6 | 0.75 |
| Maximum value for Link Weights: Wmax | 1.0 | 1.0 | 0.9 | 1.0 |

(Simulation Result)

Figure 12:
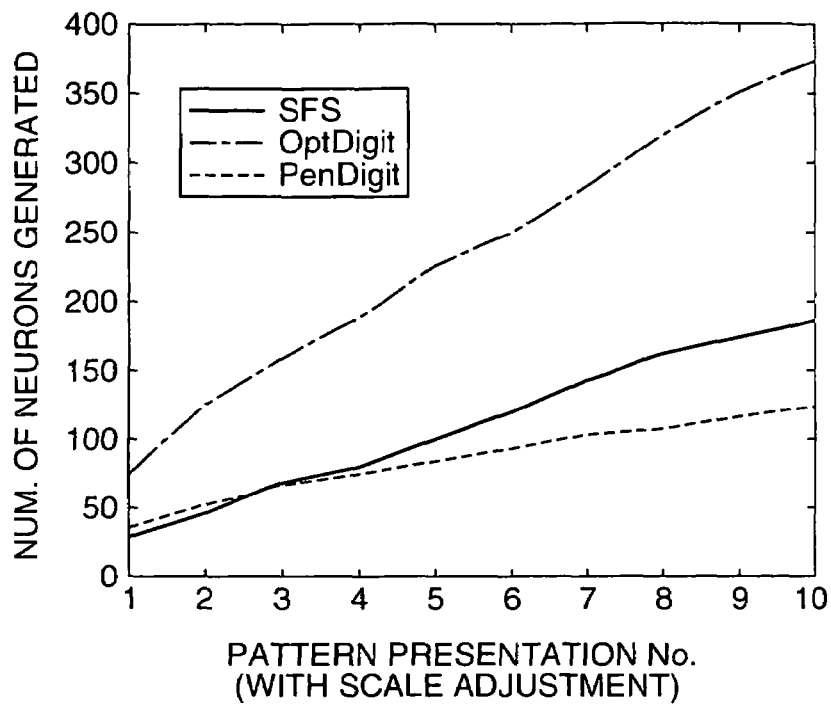
FIG. 12 depicts an experiment result of the first simulation experiment example (a change in the number of RBF elements (neurons) in the construction phase of the self-organizing neural network structure)
Figure 13:
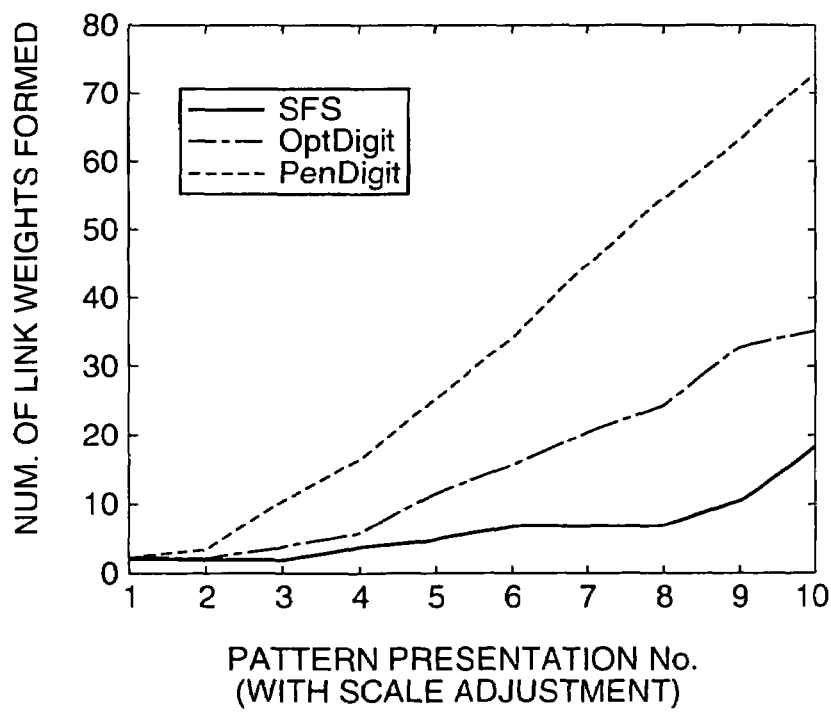
FIG. 13 depicts an experiment result of the first simulation experiment example (a change in the number of weights (links) in the construction phase of the self-organizing neural network structure)

FIGS. 12 and 13 depict experiment results of the first simulation experiment. FIG. 12 depicts variations in the number of RBF elements (neurons) in the construction phase of the self-organizing neural network structure. FIG. 13 depicts variations in the number of weights (link weights) in the construction phase of the self-organizing neural network structure.

As can be seen from FIGS. 12 and 13, the number of RBF elements and the number of weights monotonically increase in the construction phase of the self-organizing neural network structure. In FIGS. 12 and 13, a scale normalized by the number of input pattern vectors (input vectors) is used in the horizontal axis. In each of FIGS. 12 and 13, therefore, the number x(i) (i=1, 2, ..., 11) in the horizontal axis corresponds to the number of input normalized pattern vectors (i.e., x(i)=i×[total number of pattern vectors in training dataset]/10).

Referring to FIGS. 12 to 13, it is understood that the data structure of the PenDigit dataset is relatively simple to the other two datasets. This is also proved by the fact that the number of formed RBF elements is quite small but the number of weights is the largest. On the other hand, the length of each pattern vector (i.e., "16" (see Table 1)) is the smallest in the three datasets and a pattern space is constructed by smaller number of data than the other datasets.

(Impact of Selection $\sigma$ Upon Performance of Self-Organizing Neural Network Structure)

It is empirically confirmed that, as for the PNN or the GRNN that is an ordinary neural network structure, a unique setting of radii within the self-organizing neural network structure gives a reasonable trade-off between the generalization performance and computational complexity. Therefore, in the construction phase of the self-organizing neural network structure in the first simulation experiment, a setting of radius $\sigma_i$ serving as parameters at $\sigma_i = \sigma$ ($\forall i$) is selected.

Nevertheless, how to select the radii $\sigma_i$ in the self-organizing neural network structure has still a great impact on the generalization performance similarly to the ordinary neural network structures GRNN and PNN. More specifically, the radius $\sigma_i$ varies from a minimum Euclidian distance that is calculated between all pairs of pattern vectors in the training dataset to a maximum Euclidian distance calculated similarly to the minimum Euclidian distance. For the three datasets (SFS, OptDigit, and PenDigit), the minimum and maximum Euclidian distances are calculated as shown in Table 3 below.

TABLE 3

Minimum and maximum Euclidean distances computed among a pair of all the vectors in the datasets

| | Minimum Euclidean Distance | Maximum Euclidean Distance |
|---|---|---|
| SFS | 2.4 | 11.4 |
| OptDigit | 1.0 | 9.3 |
| PenDigit | 0.1 | 5.7 |

Figure 14:
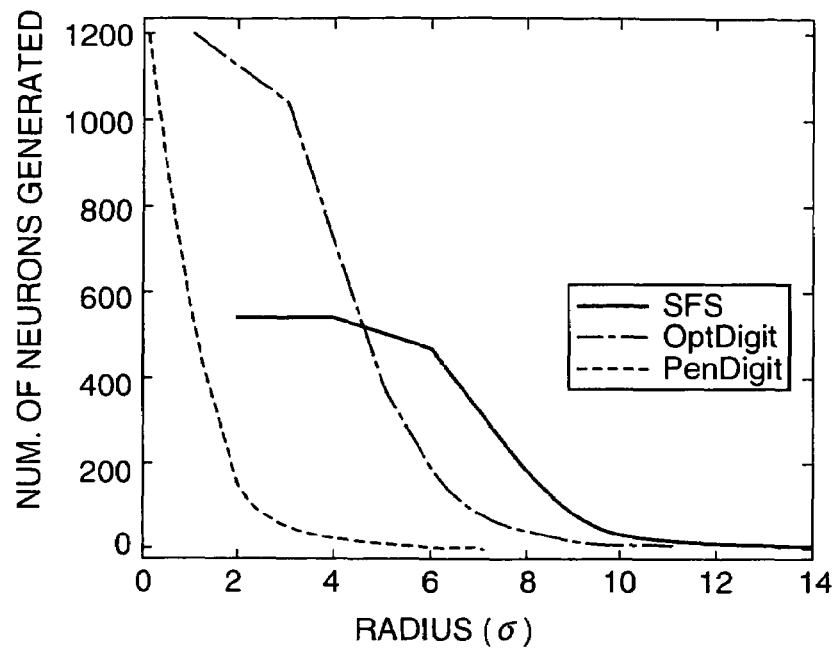
FIG. 14 depicts an experiment result of the first simulation experiment example (the relationship between radii and formed RBF elements (neurons) in the self-organizing neural network structure)
Figure 15:
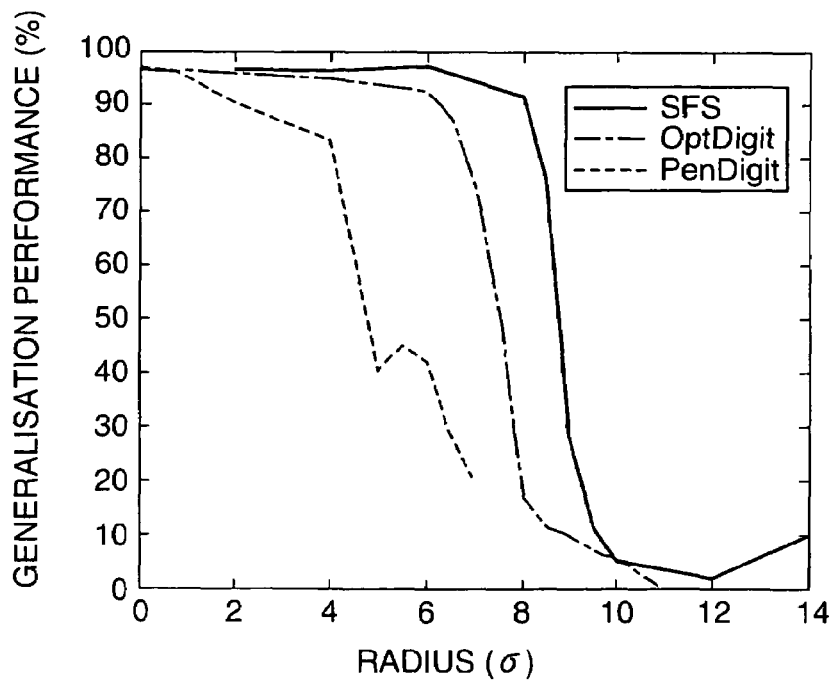
FIG. 15 depicts an experiment result of the first simulation experiment example (the relationship between the radi and the generalization performance in the self-organizing neural network structure)

FIGS. 14 and 15 depict the relationship between the radius $\sigma$ and the formed RBF elements (neurons) and that between the radius $\sigma$ and the generalization performance in the self-organizing neural network structure, respectively.

As shown in FIGS. 14 and 15, each of the number of formed RBF elements (neurons) and the generalization performance greatly changes according to the value of the radius $\sigma$. Specifically, when the radius $\sigma$ is close to the minimum Euclidian distance, the number of RBF elements is substantially identical to the number of pattern vectors in the data set. In other words, substantially all training datasets are exhausted in the construction phase of the self-organizing neural network structure in such a case. FIGS. 14 and 15, however, also indicate that a decrease in the number of RBF elements does not always cause relative deterioration in generalization performance. This tendency can be also confirmed from the relationship shown in FIG. 16, that is, the relationship between the radius $\sigma$ and the number of weights (link weights) connected correctly (i.e., the number of weights each of which establishes the connection between the RBF elements having the same class label).

Figure 16:
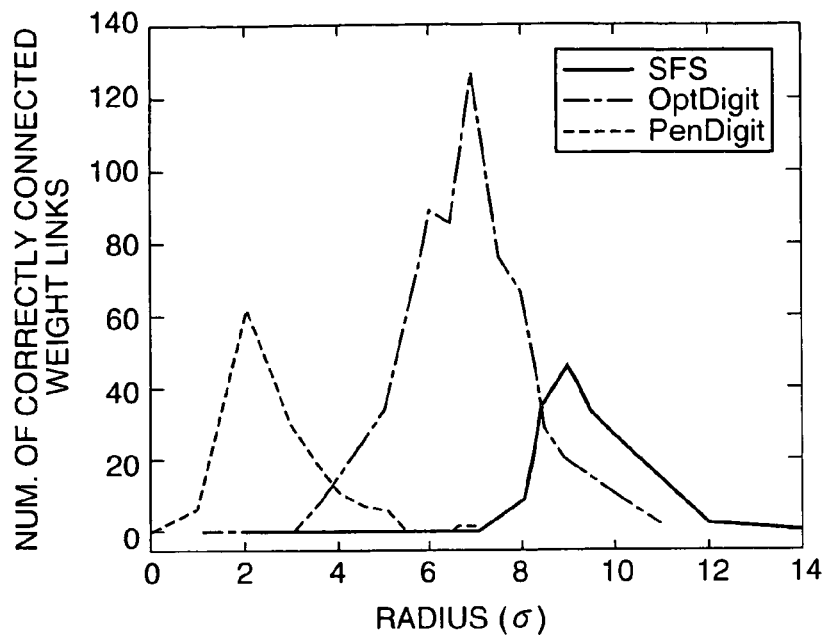
FIG. 16 depicts an experiment result of the first simulation experiment example (the relationship between radii and formed weights (links) in the self-organizing neural network structure)

If FIG. 16 is compared with FIG. 15, it is understood that when the number of correctly connected weights decreases from a peak, the generalization performance is dramatically deteriorated in each dataset. From this observation, it is confirmed that the radii $\sigma$ of the respective datasets shown in Table 2 are reasonably selected. It is also confirmed that the ratio of correctly connected weights to wrong weights is sufficiently high (i.e., the actual ratios are 2.1 and 7.3 for the SFS and OptDigit datasets, respectively, whereas the number of wrong weights is zero for the Pendigit dataset).

(Generalization Performance of Self-Organizing Neural Network Structure)

In Table 4 below, the self-organizing neural network structure constructed using the parameters shown in Table 2 (that is, the self-organizing neural network structure for which all pattern vectors used for construction have completely been input) is compared with the PNN having the centroid calculated by a well-known MacQueen's k-means clustering algorithm in terms of performance. In order to make comparison between the two network structures as fairly as possible, the number of neurons in the PNN responsible for respective classes is set identical to the number of RBF elements (neurons) in the self-organizing neural network structure.

TABLE 4

Comparison of generalisation performance between the self-organizing neural network structure (SOKM) and a PNN using the k-means clustering algorithm

|  | Total Num. of Neurons Generated within SOKM | Generalisation Performance of SOKM | Generalisation Performance of PNN with k-means |
|---|---|---|---|
| SFS | 184 | 91.9% | 88.9% |
| OptDigit | 370 | 94.5% | 94.8% |
| PenDigit | 122 | 90.8% | 88.0% |

As shown in Table 4, for the three datasets, the overall generalization performance of the self-organizing neural network structure is substantially equal or slightly better than that of the PNN. Nevertheless, differently from the ordinary neural network structures GRNN and PNN, the number of RBF elements (neurons) in the self-organizing neural network structure is automatically determined by an autonomous algorithm. The self-organizing neural network structure is dynamic as compared with the ordinary neural network structures GRNN and PNN in this respect.

(Varying Pattern Presentation Order)

For the self-organizing neural network structure, a normal "well-balanced" pattern vector input order, as a typical manner of constructing the pattern classifier stated above, is for example, Pattern #1 of Digit/Zero/, Pattern #1 of Digit/One/, . . . , Pattern #1 of Digit/NINE/, Pattern #2 of Digit/ZERO/, Pattern #2 of Digit/One/, . . . , Pattern #2 of Digit/NINE/ . . . , etc). Alternatively, the order of input pattern vectors can be (1) changed at random or (2) changed so as to accompany new classes. Namely, the order may be Pattern #1 of Digit/ZERO/, Pattern #2 of Digit/ZERO/, . . . , Last Pattern of Digit/ZERO/, Pattern #1 of Digit/ONE/, Pattern #2 of Digit/ONE/, . . . . It is already confirmed that such a change does not affect the number of formed RBF elements (neurons), the number of weights (link weights), and the generalization performance. This implies that the self-organizing neural network structure possesses not only performance of accommodating new classes similarly to the PNN but also robustness to conditional changes.

Second Simulation Experiment Example (Simultaneous Dual-Domain Pattern Recognition)

In the first simulation experiment example, it is confirmed that in the field of pattern recognition, the self-organizing neural network structure possesses the generalization performance equal to or slightly better than those of the ordinary neural network structures PNN and GRNN. However, this reveals only one of the features of the self-organizing neural network structure. Namely, the self-organizing neural network structure is also characterized by being applicable to a processing of multiple domains having a plurality of modalities. In the second simulation experiment example, therefore, another practical simulation is conducted to the pattern recognition of multiple domains (i.e., simultaneous pattern recognition of dual domains) for the self-organizing neural network structure in order to understand the latter feature of the self-organizing neural network structure.

The self-organizing neural network structure constructed in the second simulation experiment example is obtained by integrating two partial self-organizing neural network structures. Namely, this self-organizing neural network structure is designed so as to simulate a situation in which excitation occurs not only to an auditory area but also a visual area in parallel, i.e., simultaneously by a specific voice input to a specific area (i.e., the auditory area) in the structure, thereby realizing "simultaneous dual-domain pattern recognition." This designing implies that appropriate built-in feature extraction mechanisms for respective modalities (the auditory modality and the visual modality) are provided in the system. This designing is, therefore, somewhat relevant to an approach of modeling "association" between different modalities, or, in a more general context, an approach of "concept formation." The "approach" used herein is an approach for handling several perceptual methods simultaneously or integrally (in a data fusion fashion), and is realized by an integral representation method called "gestalt."

(Parameter Setting)

In the second simulation experiment example, an SFS dataset (for digit voice recognition) and a PenDigit dataset (for digit character recognition) are used. These two datasets are employed to construct partial self-organizing neural network structures for corresponding specific domain data, respectively. Cross-domain weights (link weights) (i.e., association links) that connect a predetermined number of RBF elements (neurons) in the two partial self-organizing neural network structures constructed using the two datasets are formed by the same method as that using the weight update algorithm stated above. Parameters for updating weights so as to perform a dual-domain pattern recognition processing are summarized in right columns of Table 2. In this example, the same weights as ordinary weights (i.e., the weights in the partial self-organizing neural network structures as summarized in left columns of Table 2) are selected. The decay factor $\xi_i$ is set at $\xi_i = \xi = 0.0005$ ($\forall_i$).

Further, in modeling such a cross-domain processing, it is necessary to consider that the order of input pattern vectors affects formation of association links. In the second simulation experiment example, therefore, pattern vectors are input alternately into two pieces of training data, i. e., in a manner like pattern vector #1 of SFS, pattern vector #1 of PenDigit, pattern vector #2 of SFS, pattern vector #2 of PenDigit.

(Simulation Result)

In second and third columns of Table 5, generalization performances in the dual-domain pattern recognition processing in the second simulation experiment example are summarized. In Table 5, "Sub-SOKM(i)→Sub-SOKM(j)" indicates the overall generalization performance obtained by the excitation of the RBF elements in the $j^{th}$ partial self-organizing neural network structure caused by the transfer of the excitation of the RBF elements in the $i^{th}$ partial self-organizing neural network structure to the RBF elements in the $j^{th}$ partial self-organizing neural network structure via the association links. In Table 5, Sub-SOKM(1) denotes a partial self-organizing neural network structure for the SFS dataset, and Sub-SOKM(2) denotes a partial self-organizing neural network structure for the PenDigit dataset.

TABLE 5

Generalisation performance of the dual domain pattern classification task

| | Generalisation Performance (GP)/Num. of Excited Neurons (Kernels) via the Associative Links (NEKAL) | | | |
|---|---|---|---|---|
| | Without Constraint | | With Constraints on Links | |
| | GP | NEKAL | GP | NEKAL |
| SFS | 86.7% | N/A | 91.4% | N/A |
| PenDigit | 89.3% | N/A | 89.0% | N/A |
| Sub-SOKM(1) → (2) | 62.4% | 141 | 73.4% | 109 |
| Sub-SOKM(2) → (1) | 88.0% | 125 | 97.8% | 93 |

Third Simulation Experiment Example (Presenting Class Labels to Self-Organizing Neural Network Structure)

In the first and second simulation experiment examples, when the new RBF element is added into the self-organizing neural network structure, the class label $\eta_i$ is given and set at the same value as the pattern vector that is a present input vector. For the self-organizing neural network structure, however, it is not always necessary to set the class label $\eta_i$ simultaneously with the input vector or the pattern vector. The class label $\eta_i$ may be set asynchronously.

Taking this into account, the third algorithm (the algorithm in light of the class label $\eta_i$) is used as the weight update algorithm in the third simulation experiment example. That is, the class label $\eta_i$ is used to adjust the weights for connecting the RBF elements. This can greatly enhance the generalization performance.

(Constraints on Formation of Weights)

In the self-organizing neural network structure, the class labels can be given at any time depending on applications. In this example, a situation which is not so typical in practice, and in which information on the class labels is known a priori, will be assumed and how such a modification affects the performance of the self-organizing neural network structure will be considered.

(Simulation Result)

Figure 17:
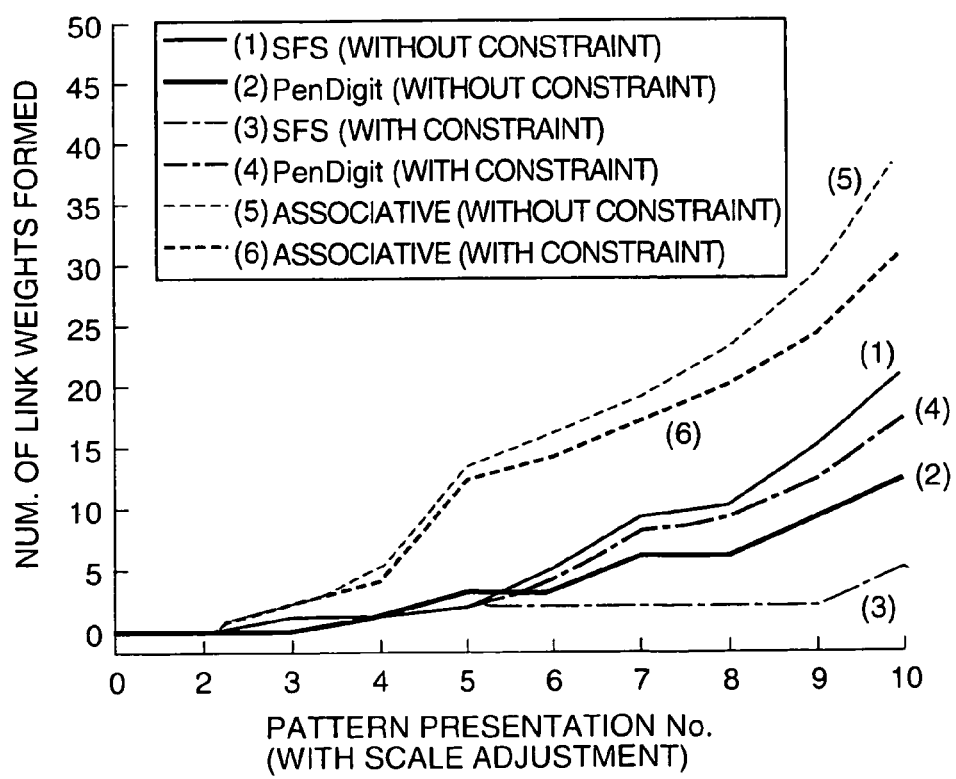
FIG. 17 depicts an experiment result of the second simulation experiment example.

FIG. 17 depicts the comparison between the number of weights in the self-organizing neural network structure constructed in a state in which constraints are imposed on class labels in the third simulation experiment example and the number of weights in the self-organizing neural network structure constructed in a state in which no constraints are imposed on the class labels. As shown in FIG. 17, for all types of weights (i.e., weights for the single SFS dataset, those for the single PenDigit dataset, and those for association links between the two datasets), the number of constraint-imposed weights is smaller than the number of constraint-free weights. This signifies that if constraints are imposed on the class label, the formation of "wrong" connection of the RBF elements (i.e., connection between the RBF elements having different class labels) is avoided in the construction phase.

What is claimed is:

1. An interconnecting neural network system comprising:
   a neural network unit that includes a plurality of neurons, each of the neurons embodying a weight holding unit, a pointer unit, a duration variable holding unit and an activation time holding unit, each of the neurons outputting an excitation strength according to a similarity between input vectors and centroid vectors based on a kernel function; and
   a network control unit that constructs an artificial neural network structure by interconnecting the neurons relating to each other among the neurons in the neural network unit via respective weights,
   wherein each of the neurons in the neural network unit outputs an excitation strength according to the similarity between the input vectors and the centroid vectors based on the kernel function when each neuron is excited by the input vector applied from an outside, and outputs a pseudo excitation strength obtained based on the sum of excitation strength outputs from the other neurons when each neuron is excited in a chain reaction to excitation of the other neuron connected to each neuron,
   wherein each of the neurons in the neural network unit has a plurality of modalities different from one another, the plurality of modalities of the neurons including auditory modality and visual modality so that a plurality of different input vectors of auditory modality and visual modality are handled simultaneously and independently by the neurons to perform auditory and visual recognition concurrently.

2. The interconnecting neural network system according to claim 1, wherein each neuron in the neural network unit outputs the pseudo excitation strength and also outputs the centroid vector of each neuron when each neuron is excited in a chain reaction to the excitation of the other neuron connected to each neuron.

3. The interconnecting neural network system according to claim 1, wherein the network control unit interconnects the neurons relating to each other among the neurons in the neural network unit, based on an order of the neurons added or excited at time series in association with a plurality of input vectors applied to the neural network unit from the outside.

4. The interconnecting neural network system according to claim 1, wherein the network control unit trains the weight that connects the neurons to each other, based on the excitation strength of each neuron in the neural network unit.

5. The interconnecting neural network system according to claim 1, wherein the network control unit removes each neuron at a predetermined timing determined based on the excitation strength of each neuron in the neural network unit.

6. The interconnecting neural network system according to claim 1, wherein each neuron in the neural network unit is an intermediate layer neuron using, as the centroid vector, centroid data in a matrix form in light of time series changes, and each intermediate layer neuron is connected to an output layer neuron that outputs a change in the excitation strength output from each intermediate layer neuron at time series.

7. The interconnecting neural network system according to claim 1, wherein the kernel function employed in each neuron in the neural network unit includes a radial basis function.

8. A computer-implemented method of constructing an interconnecting neural network structure, the method comprising the steps of:
   preparing an artificial neural network structure including a plurality of neurons, each of the neurons embodying a weight holding unit, a pointer unit, a duration variable holding unit and an activation time holding unit, each of the neurons outputting an excitation strength according to a similarity between input vectors and centroid vectors based on a kernel function, the neurons relating to each other interconnected in the artificial neural network structure via respective weights; and training the weight that connects the neurons to each other, based on the excitation strength of each neuron, wherein each of the neurons in the artificial neural network structure has a plurality of modalities different from one another, the plurality of modalities of the neurons including auditory modality and visual modality so that a plurality of different input vectors of auditory modality and visual modality are handled simultaneously and independently by the neurons to perform auditory and visual recognition concurrently.

9. The method according to claim 8, wherein, in the step of preparing the artificial neural network structure, the neurons relating to each other are interconnected in the artificial neural network structure based on an order of the neurons added or excited at time series in association with a plurality of input vectors applied from an outside.

10. The method according to claim 8, further comprising a step of removing each neuron at a predetermined timing determined based on the excitation strength of each neuron.

11. The method according to claim 8, wherein the kernel function employed in each neuron includes a radial basis function.

12. A computer readable recording medium storing an interconnecting neural network structure construction program that allows a computer to execute the method according to claim 8.

13. A computer-implemented method of constructing a self-organizing neural network structure including a plurality of neurons, each of the neurons embodying a weight holding unit, a pointer unit, a duration variable holding unit and an activation time holding unit, each of the neurons outputting an excitation strength according to a similarity between input vectors and centroid vectors based on a kernel function, the neurons relating to each other being autonomously connected in the self-organizing neural network structure based on the input vector, the method comprising:

a first step of adding a neuron, which has input vectors as centroid vectors for a kernel function, into the self-organizing neural network structure as a new neuron based on input vectors that is input first from an outside; and a second step of repeating the following processings (a) to (c), each of the processings being based on input vectors that is an $n^{th}$ input vector from the outside, where n is an integer equal to or greater than 2:

(a) the processing of calculating excitation strengths of all the neurons in the self-organizing neural network structure based on the $n^{th}$ input vector input from the outside;

(b) the processing of adding a neuron, which has the $n^{th}$ input vector as a centroid vector for a kernel function, into the self-organizing neural network structure as a new neuron in case that it is determined by the processing (a) that there is no neuron excited such that the excitation strength thereof exceeds a predetermined threshold, among one or a plurality of neurons in the self-organizing neural network structure; and (c) the processing of performing both of or one of formation of a weight that connects the neurons, and training of the formed weight based on the excitation strengths of the neurons in the self-organizing neural network structure;

wherein each of the neurons in the self-organizing neural network structure has a plurality of modalities different from one another, the plurality of modalities of the neurons including auditory modality and visual modality so that a plurality of different input vectors of auditory modality and visual modality are handled simultaneously and independently by the neurons to perform auditory and visual recognition concurrently.

14. The method according to claim 13, wherein, in the second step, a processing (d) of removing a neuron determined to be unnecessary based on the excitation strengths of the neurons in the self-organizing neural network structure is further performed.

15. The method according to claim 13, wherein each of the neurons in the self-organizing neural network structure holds a class label relating to a final output, and, in the processing (c) in the second step, only in case that the class label held by each neuron in the self-organizing neural network structure is identical, both of or one of the formation of the weight that connects the neurons, and the training of the formed weight is performed based on the excitation strengths of the neurons.

16. The method according to claim 13, wherein the kernel function employed in each neuron includes a radial basis function.

17. A computer readable recording medium storing an interconnecting neural network structure construction program that allows a computer to execute the method according to claim 13.

18. An interconnecting neural network system comprising:

a plurality of intermediate layer neurons, each of the intermediate layer neurons embodying a weight holding unit, a pointer unit, a duration variable holding unit and an activation time holding unit, each of the intermediate layer neurons outputting an excitation strength according to a similarity between input vectors and centroid vectors based on a kernel function, and each of the intermediate layer neurons using centroid data in a matrix form in light of time series changes as the centroid vector; and an output layer neuron connected to each of the intermediate layer neurons and outputting a change in the excitation strength output from each intermediate layer neuron at time series, wherein each of the neurons has a plurality of modalities different from one another, the plurality of modalities of the neurons including auditory modality and visual modality so that a plurality of different input vectors of auditory modality and visual modality are handled simultaneously and independently by the neurons to perform auditory and visual recognition concurrently.

19. The interconnecting neural network system according to claim 18, wherein the kernel function employed in each intermediate layer neuron includes a radial basis function.

* * * * *